United States Patent
Kim et al.

(10) Patent No.: US 11,450,041 B2
(45) Date of Patent: Sep. 20, 2022

(54) METHOD AND ELECTRONIC DEVICE FOR CORRECTING HANDWRITING INPUT

(71) Applicant: Samsung Electronics Co., Ltd., Suwon-si (KR)

(72) Inventors: Dohyeon Kim, Suwon-si (KR); Evgenii Bahtyn, Kyiv (UA); Ivan Deriuga, Kyiv (UA); Olga Radyvonenko, Kyiv (UA); Vadym Osadchyi, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/088,901

(22) Filed: Nov. 4, 2020

(65) Prior Publication Data
US 2021/0134029 A1 May 6, 2021

(30) Foreign Application Priority Data
Nov. 4, 2019 (KR) .................... 10-2019-0139708

(51) Int. Cl.
*G06T 11/20* (2006.01)
*G06T 7/73* (2017.01)
(Continued)

(52) U.S. Cl.
CPC ............. *G06T 11/203* (2013.01); *G06T 3/20* (2013.01); *G06T 3/40* (2013.01); *G06T 7/60* (2013.01);
(Continued)

(58) Field of Classification Search
CPC .... G06F 3/04883; G06F 3/016; G06F 40/103; G06F 40/171; G06F 40/30;
(Continued)

(56) References Cited

U.S. PATENT DOCUMENTS

| 10,007,420 B2 | 6/2018 | Jung et al. |
| 10,754,373 B2 | 8/2020 | Kwak et al. |

(Continued)

FOREIGN PATENT DOCUMENTS

| CN | 102831418 | 12/2012 |
| CN | 107590497 | 1/2018 |

(Continued)

OTHER PUBLICATIONS

Husam Ahmed Al Hamad, "Skew Detection/Correction and Local Minima/Maxima Techniques for Extracting a New Arabic Benchmark Database", (IJACSA) International Journal of Advanced Computer Science and Applications, vol. 6, No. 3, Jan. 2015, 11 pages.

(Continued)

*Primary Examiner* — Jin Cheng Wang
(74) *Attorney, Agent, or Firm* — Nixon & Vanderhye P.C.

(57) ABSTRACT

Disclosed is an electronic device including: a memory, and a processor operatively connected to the memory. The memory stores instructions which, when executed, cause the processor to: obtain handwriting data including at least one letter; align the at least one letter with a reference line to generate target handwriting data; change at least one of a position or an angle of the at least one letter to generate distorted handwriting data; obtain correction information for correcting the distorted handwriting data to correspond to the target handwriting data; and store the correction information in the memory.

14 Claims, 24 Drawing Sheets

(51) Int. Cl.
*G06T 3/20* (2006.01)
*G06T 3/40* (2006.01)
*G06T 7/60* (2017.01)
*G06V 30/32* (2022.01)
*G06F 3/01* (2006.01)

(52) U.S. Cl.
CPC .............. *G06T 7/74* (2017.01); *G06V 30/333* (2022.01); *G06F 3/016* (2013.01); *G06T 2207/20084* (2013.01)

(58) Field of Classification Search
CPC ........... G06K 2209/01; G06K 9/00402; G06K 9/344; G06K 9/348; G06K 9/222; G06K 9/00409; G06K 9/00416; G06K 9/00865; G06K 9/342; G06K 9/6271; G06T 3/0075; G06T 11/203; G06T 2207/20084; G06T 3/20; G06T 3/40; G06T 7/60; G06T 7/74
See application file for complete search history.

(56) References Cited

U.S. PATENT DOCUMENTS

| | | | |
|---|---|---|---|
| 2007/0003142 A1* | 1/2007 | Simard | G06K 9/00416 382/187 |
| 2010/0066691 A1* | 3/2010 | Li | G06F 40/171 345/173 |
| 2011/0268351 A1 | 11/2011 | Huo | |
| 2013/0106865 A1* | 5/2013 | Eibye | G06K 9/00416 345/467 |
| 2013/0343639 A1* | 12/2013 | Benko | G06T 11/60 382/155 |
| 2016/0063342 A1* | 3/2016 | Sugiura | G06K 9/62 382/187 |
| 2016/0147723 A1 | 5/2016 | Lee et al. | |
| 2017/0161866 A1* | 6/2017 | Baudry | G06T 3/0075 |
| 2017/0287992 A1 | 10/2017 | Kwak et al. | |
| 2018/0032494 A1* | 2/2018 | Charles | G06K 9/00416 |
| 2018/0293435 A1 | 10/2018 | Wang | |
| 2020/0242825 A1 | 7/2020 | Kim et al. | |

FOREIGN PATENT DOCUMENTS

| | | |
|---|---|---|
| JP | 2007-316754 | 12/2007 |
| JP | 2015-059970 | 3/2015 |
| KR | 1994-0020258 | 9/1994 |
| KR | 10-2014-0089915 A | 7/2014 |
| KR | 10-2015-0031953 | 3/2015 |
| KR | 10-2017-0011638 | 2/2017 |
| KR | 10-2085334 B1 | 3/2020 |
| KR | 10-2020-0101481 | 8/2020 |

OTHER PUBLICATIONS

Rudra N. Hota, et al., "A Simple and Efficient Lane Detection using Clustering and Weighted Regression", 15th International Conference on Management of Data, COMAD 2009, Mysore, India, Dec. 9-12, 2009, 8 pages.

Vaishali N. Katkar, et al., "Skew Detection and Correction in Handwritten Hindi Document", 4 pages, 2015.

L. B. Mahanta, et al., "Skew and Slant Angles of Handwritten Signature", International Journal of Innovative Research in Computer and Communication Engineering, vol. 1, Issue 9, Nov. 2013, 4 pages.

Gouranga Mandal, "An Unprecedented Approach of Skew Detection and Correction for Online Bengali Handwritten Words", International Journal of Advanced Research in Computer Engineering & Technology (IJARCET), vol. 7, Issue 2, Feb. 2018, 6 pages.

Jipeng Tian, et al., "Skew Correction for Chinese Character using Hough Transform", International Journal of Computer Applications (0975-8887), vol. 22, No. 2, May 2011, 5 pages.

International Search Report and Written Opinion dated Feb. 22, 2021 in corresponding International Application No. PCT/KR2020/015330.

* cited by examiner

METHOD AND ELECTRONIC DEVICE FOR CORRECTING HANDWRITING INPUT

CROSS-REFERENCE TO RELATED APPLICATION

This application is based on and claims priority under 35 U.S.C. § 119 to Korean Patent Application No. 10-2019-0139708, filed on Nov. 4, 2019, in the Korean Intellectual Property Office, the disclosure of which is incorporated by reference herein in its entirety.

BACKGROUND

Field

The disclosure relates to a technique for correcting a handwriting input.

Description of Related Art

An electronic device such as a smart phone can recognize a handwriting input using a user's body part or an electronic pen. For example, the electronic device may include an input device that detects a user's body part or approach and contact of the electronic pen to recognize a handwriting input by the user's body part or the electronic pen received through the input device.

If there is distortion in handwriting data according to the recognized handwriting input, the electronic device can correct the distortion and reconstruct the handwriting data in a beautiful form. For example, an electronic device can detect the slope of handwriting data through feature points of each letter, and correct the slope of handwriting data through a histogram, a chain code, a Hough transform, or a statistical analysis method.

However, the method of correcting the distortion of handwriting data by an existing electronic device is limited to a method for finding the maximum frequency of the baseline or histogram of the handwriting data. Accordingly, the diversity of handwriting (or letters), such as the size, height, position, or connection structure between strokes, was not sufficiently considered. In addition, since the existing method of correcting the distortion of handwriting data is designed according to the characteristics of a specific language, it may be difficult to design in consideration of all characteristics of various languages and letters.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a method of learning data capable of correcting distortion of handwriting data through various modifications of handwriting data and correcting a handwriting input, based on the learned data, and an electronic device supporting the same.

An electronic device according to various example embodiments may include: a memory, and a processor operatively connected to the memory, wherein the memory may store instructions which, when executed, cause the processor to: obtain handwriting data including at least one letter; align the at least one letter with a reference line to generate target handwriting data; change at least one of a position or an angle of the at least one letter to generate distorted handwriting data; obtain correction information for correcting the distorted handwriting data to correspond to the target handwriting data; and store the correction information in the memory.

In addition, an electronic device according to various example embodiments may include: an input module including input circuitry, a memory including correction information for correcting at least one of a position or an angle of at least one letter included in each of a plurality of handwriting data, and a processor operatively connected to the input module and the memory, wherein the memory stores instructions which, when executed, cause the processor to: receive a handwriting input through the input module; determine whether at least one letter included in handwriting data corresponding to the handwriting input is aligned with a reference line; and based on the at least one letter not being aligned with the reference line, change at least one of a position or an angle of the at least one letter to align with the reference line, based on the correction information stored in the memory.

In addition, a method of correcting a handwriting input of an electronic device according to various example embodiments may include: obtaining handwriting data including at least one letter; generating target handwriting data by aligning the at least one letter with a reference line; generating distorted handwriting data by changing at least one of a position or an angle of the at least one letter; obtaining correction information for correcting the distorted handwriting data to correspond to the target handwriting data; and storing the correction information in a memory of the electronic device.

According to various example embodiments, not only linear handwriting data distortion but also nonlinear handwriting data distortion can be corrected by correcting a handwriting input based on data learned through deformation of various handwriting data.

In addition, according to various example embodiments, the handwriting input can be corrected regardless of the language and letter characteristics by correcting the handwriting input based on learned data rather than applying a rule designed for each language or letter characteristics.

In addition to this, various effects that are directly or indirectly identified through this document can be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

In connection with the description of the drawings, the same or similar reference numerals may be used for the same or similar components.

DETAILED DESCRIPTION

Figure 1:
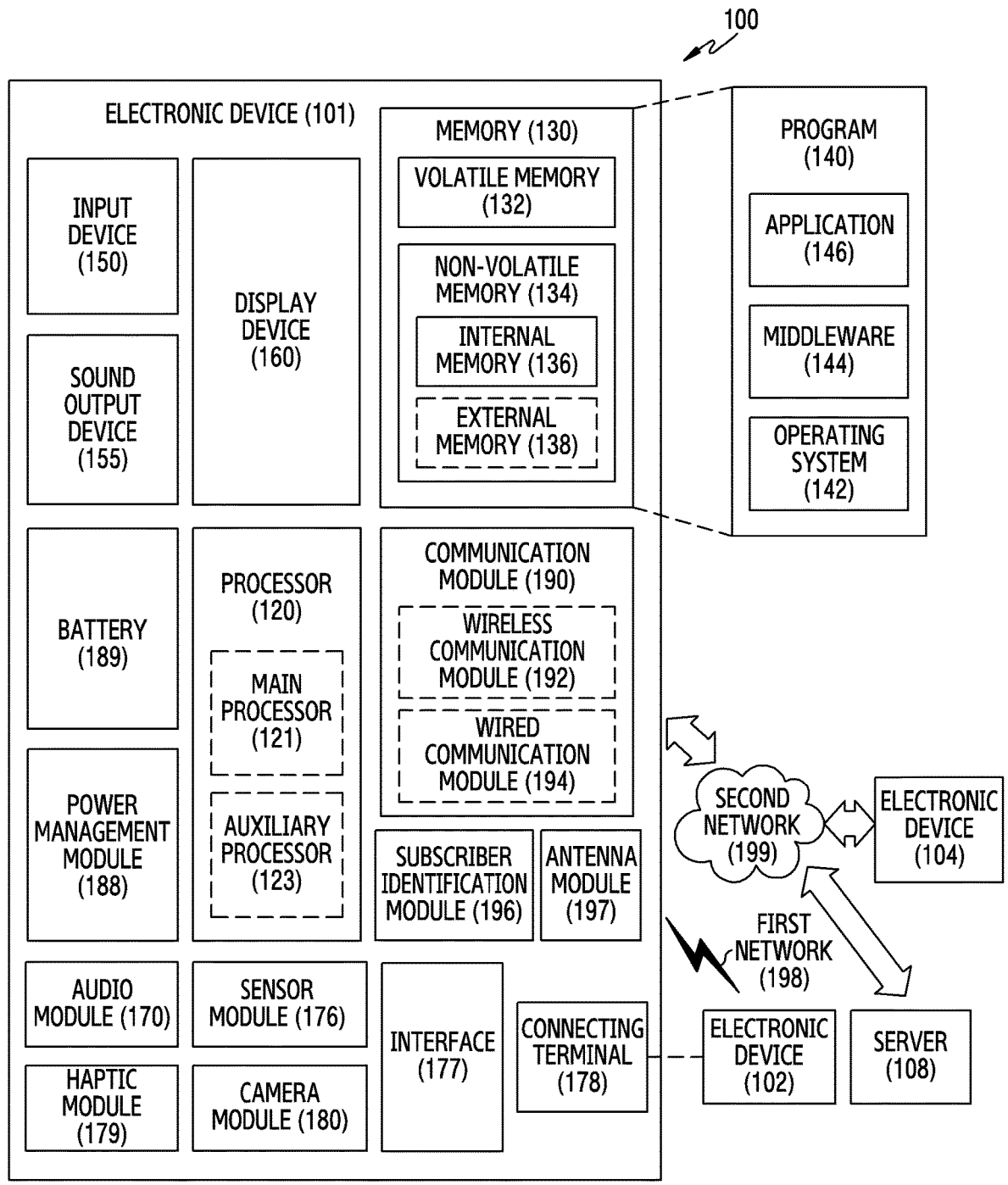
FIG. 1 is a block diagram illustrating an example electronic device in a network environment according to various embodiments.

Hereinafter, various example embodiments will be described in greater detail with reference to the accompanying drawings. For convenience of explanation, the components illustrated in the drawings may be exaggerated or reduced in size, and the disclosure is not necessarily limited by what is illustrated.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. In some embodiments, some (e.g., the sensor module 176, the camera module 180, or the antenna module 197) of the components may be implemented as single integrated circuitry.

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, if the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., a neural network processing device) may include a hardware structure specialized for processing an artificial intelligence model. The artificial intelligence model may be created through machine learning. Such learning may be performed, for example, in the electronic device 101 on which artificial intelligence is performed, or may be performed through a separate server (e.g., the server 108). A learning algorithm may include, for example, supervised learning, unsupervised learning, semi-supervised learning, or reinforcement learning, but is not limited to the aforementioned example. The artificial intelligence model may include a plurality of artificial neural network layers. The artificial neural network may be one of a Deep Neural Network (DNN), a Convolutional Neural Networks (CNN), a Recurrent Neural Network (RNN), a Restricted Boltzmann Machine (RBM), a Deep Belief Network (DBN), a Bidirectional Recurrent Deep Neural Network (BRDNN), a deep Q-network, or a combination of at least two of those elements, but is not limited to the aforementioned example. In addition to the hardware structure, additionally or alternatively, the artificial intelligence model may include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for an incoming call. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155, or an external electronic device (e.g., an electronic device 102)(e.g., a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network evolved from a 4G network and a next-generation communication technology, for example, a New Radio (NR) access technology. The NR access technology may support enhanced Mobile Broadband (eMBB), massive Machine Type Communications (mMTC), or Ultra-Reliable and Low-Latency Communications (URLLC). The wireless communication module 192 may support, for example, a high frequency band (e.g., an mmWave band) to achieve a high data rate. The wireless communication module 192 may support various technologies for securing performance in a high frequency band, for example, beamforming, massive array Multiple-Input and Multiple-Output (MIMO), and Full-Dimensional MIMO (FD-MIMO), an array antenna, analog beamforming, or a large scale antenna. The wireless communication module 192 may support various requirements defined in the electronic device 101, an external electronic device (e.g., the electronic device 104), or a network system (e.g., the second network 199). According to an embodiment, the wireless communication module 192 may support a peak data rate (e.g., 20 Gbps or more) for realizing eMBB, a loss coverage (e.g., 164 dB or less) for realizing mMTC, or U-plane latency (e.g., 0.5 ms or less or a round trip of 1 ms or less for each of downlink (DL) and uplink (UL)) for realizing URLCC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas (e.g., array antenna). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may construct an mmWave antenna module. According to an embodiment, the mmWave antenna module may include a printed circuit board, an RFIC disposed on or adjacent to a first face (e.g., a bottom face) of the printed circuit board and capable of supporting a designated high frequency band (e.g., an mmWave band), and a plurality of antennas (e.g., an array antenna) disposed on or adjacent to a second face (e.g., a top face or a side face) of the printed circuit board and capable of transmitting or receiving a signal in the designated high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To this end, for example, technologies of cloud computing, distributed computing, Mobile Edge Computing (MEC), or client-server computing may be used. The electronic device 101 may provide an ultra-low latency service using, for example, distributed computing or mobile edge computing. In an embodiment, the external electronic device 104 may include an Internet of Things (IoT) device. The server 108 may be an intelligent server using machine learning and/or neural networks. According to an embodiment, the external electronic device 104 or the server 108 may be included in the second network 199. The electronic device 101 may be applied to an intelligent service (e.g., a smart home, a smart city, a smart car, or health care) based on a 5G communication technique and an IoT related technique.

Figure 2:
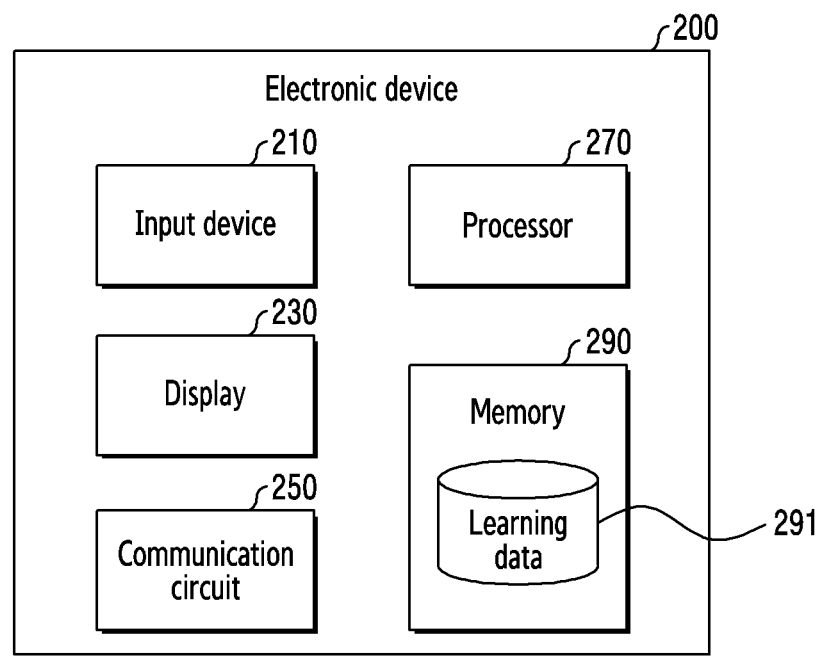
FIG. 2 is a block diagram illustrating an electronic device according to various embodiments.

FIG. 2 is a block diagram illustrating an example electronic device according to various embodiments.

Referring to FIG. 2, the electronic device 200 (e.g., the electronic device 101 of FIG. 1) may include an input device (e.g., including input circuitry) 210 that detects a user's body part or approach or contact of an electronic pen to recognize a part of the user's body received through the input device 210 or a handwriting input by an electronic pen. In addition, when there is distortion in the handwriting data according to the recognized handwriting input, the electronic device 200 may correct the distortion of the handwriting data to reconstruct the same into beautiful handwriting data. To this end, the electronic device 200 may learn data capable of correcting distortion of handwriting data through deformation of various handwriting data, and may correct a handwriting input based on the learned data.

In order to perform the above-described function, the electronic device 200 may include an input device (e.g., including input circuitry) 210 (e.g., the input device 150 in FIG. 1), a display 230 (e.g., the display device 160 of FIG. 1), a communication circuit 250 (e.g., the communication module 190 of FIG. 1), a processor (e.g., including processing circuitry) 270 (e.g., the processor 120 of FIG. 1), and a memory 290 (e.g., the memory 130 of FIG. 130). However, the configuration of the electronic device 200 is not limited thereto. According to various embodiments, the electronic device 200 may omit at least one of the above-described components, and may further include at least one other component. For example, the electronic device 200 may omit the communication circuit 250.

The input device 210 may include various input circuitry and detect the approach or contact of a user's body part or the electronic pen. For example, the input device 210 may include an input detecting circuit, and may receive a handwriting input using a user's body part or a handwriting input using an electronic pen through the input detecting circuit. The input device 210 may include, for example, at least one of a touch panel and a digitizer. The touch panel may use at least one of a capacitive type, a pressure sensitive type, an infrared type, and an ultrasonic type. The digitizer may detect the approach or contact of an electronic pen that supports electromagnetic resonance (EMR). The digitizer may be a part of the touch panel or may be configured as a separate sheet for recognition. According to an embodiment, at least one of the touch panel and the digitizer may be stacked so that the display panel of the display 230 and at least a partial region overlaps each other. In addition, the input device 210 including at least one of the touch panel and the digitizer may be provided integrally with the display 230. In this case, the input device 210 and the display 230 may be referred to as a touch screen display (or touch screen).

The display 230 may display various contents (e.g., text, images, videos, icons, symbols, etc.) to the user. The display 230 may include a touch screen, and may receive, for example, a touch, gesture, proximity, or hovering input using an electronic pen or a user's body part. According to an embodiment, the display 230 may output a result of recognizing a handwriting input received through the input device 210 on a screen. For example, the display 230 may display a path of a handwriting input on the screen so as to correspond to an input path (a path in which the user's finger or electronic pen touches and moves on the screen) of a user's finger or an electronic pen on the screen of the display 230.

The communication circuit 250 may include various communication circuitry and support communication between the electronic device 200 and an external electronic device. According to an embodiment, the communication circuit 250 may receive data (e.g., learning data 291) capable of correcting distortion of handwriting data from an external electronic device (e.g., the server 108 of FIG. 1). According to an embodiment, the communication circuit 250 may transmit at least one of a handwriting input received through the input device 210, a recognition result of the received handwriting input, or data (e.g., learning data 291) capable of correcting distortion of handwriting data according to the received handwriting input to the external electronic device.

The processor 270 may include various processing circuitry and control at least one other component of the electronic device 200 and may perform various data processing or operations. According to an embodiment, the processor 270 may execute at least one command configured to perform functions related to correction of a handwriting input, such as reception of a handwriting input through the input device 210, recognition of the received handwriting input, distortion correction of handwriting data according to the recognized handwriting input, etc.

According to an embodiment, the processor 270 may recognize a handwriting input received through the input device 210. In addition, the processor 270 may correct the distortion of the handwriting data when there is distortion in the handwriting data according to the recognized handwriting input. When correcting the distortion of the handwriting data, the processor 270 may use the learning data 291 stored in the memory 290. The learning data 291 may include data learned in a process of restoring (or correcting) the distorted handwriting data into target handwriting data after distortion is applied to handwriting data through deformation of various handwriting data. A process related to learning will be described in greater detail below with reference to FIGS. 3 to 18. In addition, a process of correcting the handwriting input using the learning data 291 will be described in greater detail below with reference to FIGS. 19 to 22.

The memory 290 may store various types of data used by at least one component of the electronic device 200. According to an embodiment, the memory 290 may store at least one command related to correction of a handwriting input. In addition, the memory 290 may store the learned learning data 291 to correct distortion of the handwriting data.

Figure 3:
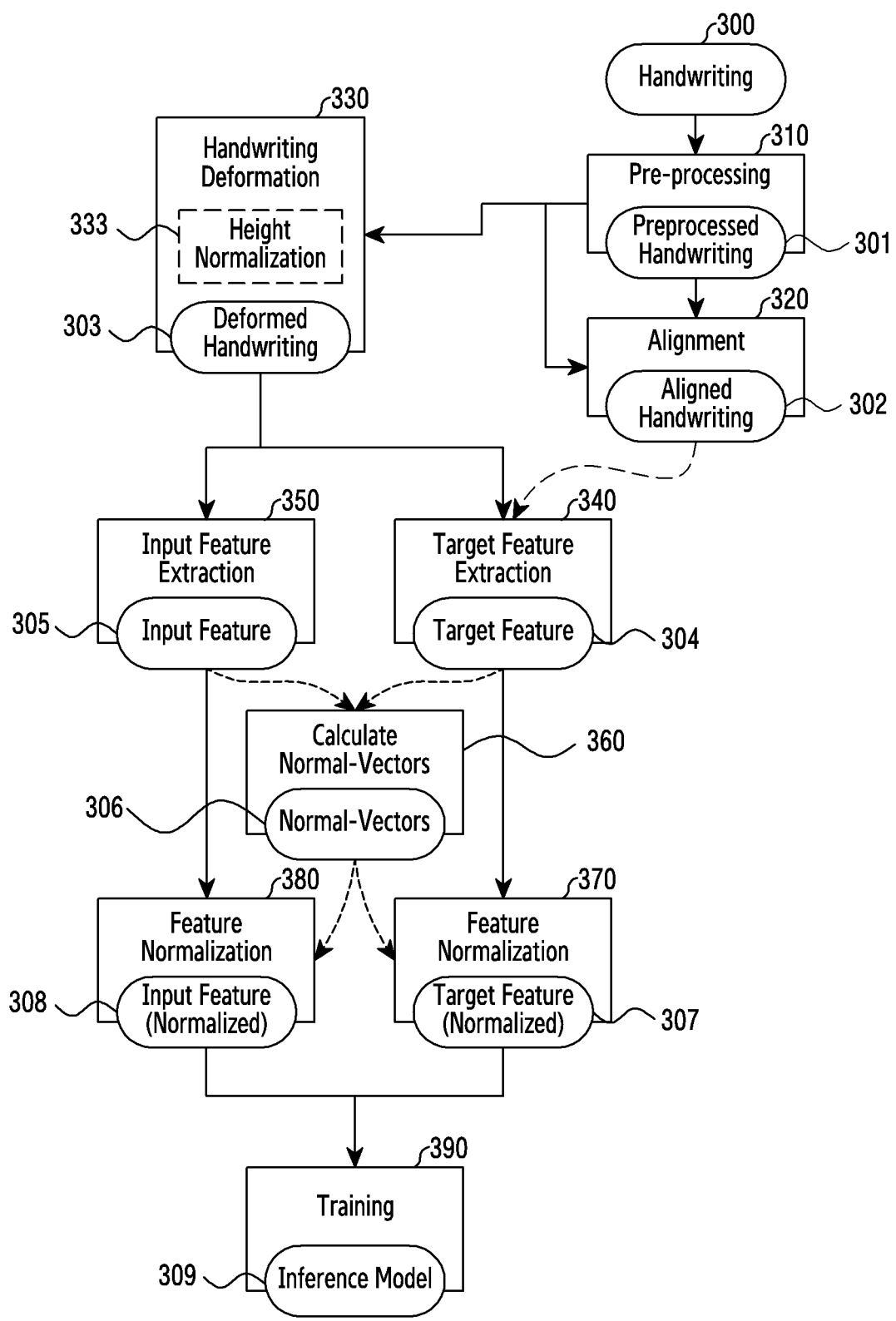
FIG. 3 is a diagram illustrating an example data learning framework for correcting distortion of handwriting data according to various embodiments.

FIG. 3 is a diagram illustrating an example data learning framework for correcting distortion of handwriting data according to various embodiments.

Referring to FIG. 3, the processor 270 of an electronic device (e.g., the electronic device 200 of FIG. 2) may learn an inference model 309 (e.g., learning data 291) for correcting distortion of the handwriting data 300 through the process of applying distortion to the handwriting data 300 through deformation of various handwriting data 300 and then restoring (or correcting) the distorted or deformed handwriting data 303 to target handwriting data (e.g., aligned handwriting data 302). The handwriting data 300, which is the source (or original) data of learning, may be handwriting data previously stored in the memory 290 of the electronic device 200 or handwriting data according to a handwriting input received through the input device 210 of the electronic device 200. In some embodiments, the handwriting data 300 may be handwriting data received from an external electronic device (e.g., the electronic device 102 of FIG. 1, the electronic device 104, or the server 108) through the communication circuit 250 of the electronic device 200.

Looking at a process for learning the inference model 309, the processor 270 may pre-process 310 the handwriting data 300. For example, the handwriting data 300 may be converted (or obtained) into preprocessed handwriting data 301. According to an embodiment, the processor 270 may perform preprocessing such as height normalization (311 in FIG. 4) or stroke simplification (312 in FIG. 4) for the handwriting data 300. However, the preprocessing 310 process is not necessarily performed. For example, the processor 270 may omit the preprocessing 310 process and perform an alignment 320 process and a deformation 330 process for the handwriting data 300.

The processor 270 may define target handwriting data that is a target for restoring (or correcting) the distorted or deformed handwriting data 303. According to an embodiment, the processor 270 may designate handwriting data 300 as source data as the target handwriting data. In an embodiment, the processor 270 may designate the preprocessed handwriting data 301 obtained by preprocessing 310 the handwriting data 300 as the target handwriting data. According to an embodiment, the processor 270 may align 320 the handwriting data 300 (or the preprocessed handwriting data 301), and designate the sorted handwriting data 302 obtained through the alignment 320 process as the target handwriting data.

The processor 270 may deform (330) the handwriting data 300 (or the preprocessed handwriting data 301) to obtain distorted handwriting data 303 that becomes input handwriting data for learning the inference model 309. According to an embodiment, the processor 270 may perform line distortion (331 in FIG. 6), and noise addition (332 in FIG. 6), or height normalization (333), etc. for the handwriting data 300 (or the preprocessed handwriting data 301).

The processor 270 may perform feature extraction (340 and 350) from target handwriting data (e.g., source handwriting data 300, pre-processed handwriting data 301 or aligned handwriting data 302) and input handwriting data (e.g., distorted handwriting data 303). For example, the processor 270 may extract (340) target feature data 304 from the target handwriting data, and extract (350) input feature data 305 from the input handwriting data. Since the target feature data 304 and the input feature data 305 may have different value ranges for each element, in order to minimize the impact on learning, the processor 270 may normalize (370, 380) the target feature data 304 and the input feature data 305. For example, the processor 270 may normalize (370) the target feature data 304 to obtain the normalized target feature data 307, and may normalize (380) the input feature data 305 to obtain the normalized input feature data 308.

According to an embodiment, the processor 270 may calculate (360) normal-vectors 306 using the target feature data 304 and the input feature data 305. For example, the processor 270 may calculate (360) at least one of an average or standard deviation of each of the target feature data 304 and the input feature data 305, and may normalize (370, 380) so that the mean is 0 and the standard deviation is 1. Also, the processor 270 may store the normalization vector 306 (e.g., at least one of an average or standard deviation) in the memory 290. According to an embodiment, the normalization vector 306 obtained through the calculation 360 process may be used in the process of normalizing (370, 380) the target feature data 304 and the input feature data 305.

The processor 270 may train (390) the inference model 309 using the target feature data 304 and the input feature data 305 (or the normalized target feature data 307 and the normalized input feature data 308). For example, the processor 270 may train (390) the inference model 309 for restoring (or correcting) the input feature data 305 (or the normalized input feature data 308) to the target feature data 304 (or the normalized target feature data 307). According to an embodiment, the processor 270 may learn 390 the inference model 309 through an algorithm based on deep learning. The deep learning-based algorithm may include, for example, a deep neural network algorithm having a recurrent neural network (RNN) structure for effectively processing sequential data.

Figure 4:
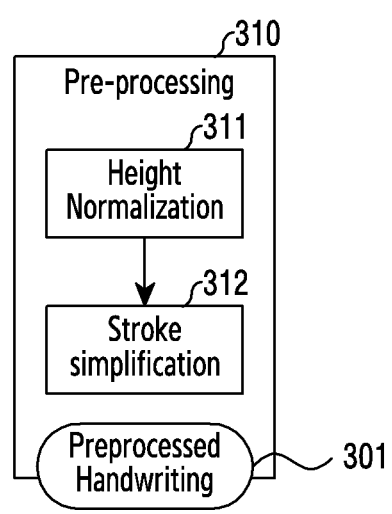
FIG. 4 is a diagram illustrating an example preprocessing process of handwriting data according to various embodiments.
Figure 5:
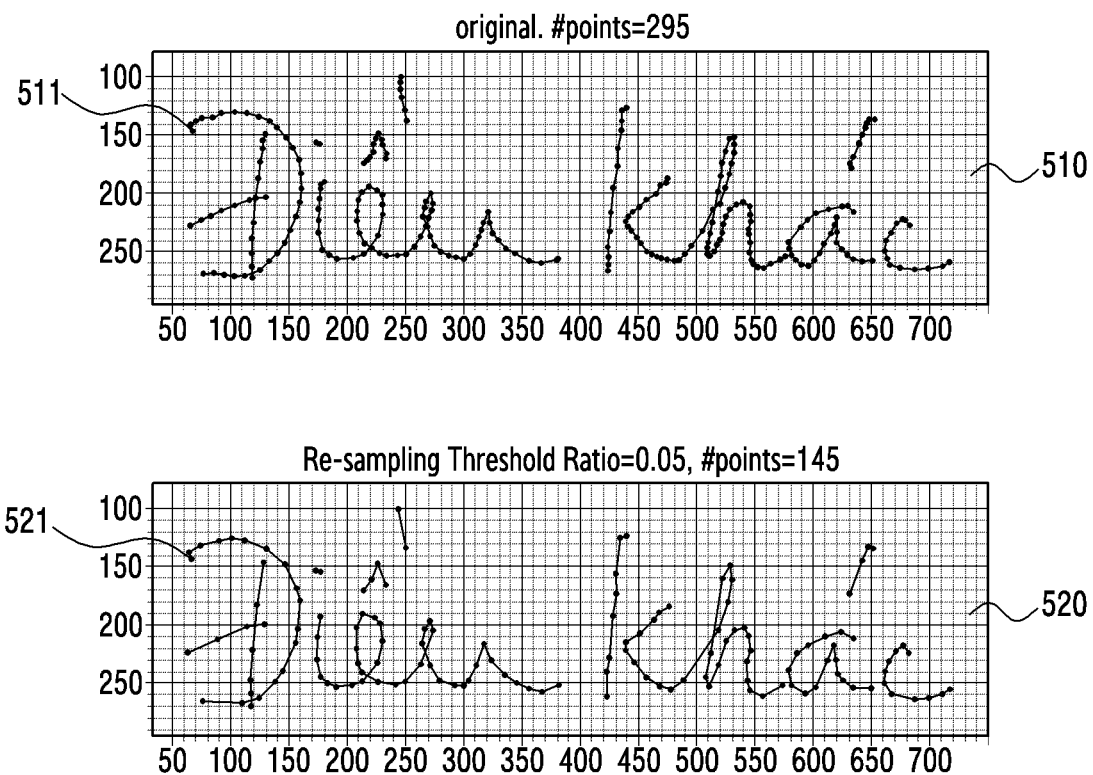
FIG. 5 is a diagram illustrating an example result of a stroke simplification process during a preprocessing process of handwriting data according to various embodiments.

FIG. 4 is a diagram illustrating an example preprocessing process of handwriting data according to various embodiments, and FIG. 5 is a diagram illustrating an example result of a stroke simplification process during a preprocessing process of handwriting data according to various embodiments.

Referring to FIGS. 4 and 5, the processor 270 of the electronic device (e.g., the electronic device 200 of FIG. 2) may obtain preprocessed handwriting data 301 by preprocessing (310) the handwriting data 300 that is the source (or original) data of learning. According to an embodiment, the processor 270 may perform height normalization (311) and stroke simplification (312) processing on the handwriting data 300.

The processor 270 may perform a height normalization 311 process on the handwriting data 300 in order to reduce dependence on various sizes (or heights) of the handwriting. For example, the processor 270 may resize the handwriting data 300 used as source data to a certain reference height (e.g., height=300) and perform interpolation processing.

The number of dots of the stroke of the handwriting may be variable depending on the resolution and sampling rate of the input detection circuit (e.g., touch panel or digitizer) that detects the handwriting input, and may act as a variable that affects the performance (e.g., speed) processing the dots. The processor 270 may perform a stroke simplification (312) process for the handwriting data 300 to improve performance. For example, the processor 270 may maintain the main features of strokes of the handwriting data 300, but unnecessary dots may be removed.

Referring to FIG. 5, even if some of the points 511 of the stroke of the handwriting data 510 (e.g., the handwriting data 300) are deleted through the stroke simplification 312 process, the main features of the stroke may be maintained due to points 521 of the stroke of the resulting handwriting data 520 (e.g., preprocessed handwriting data 301).

According to an embodiment, the processor 270 may simplify the stroke by removing some of the points of the stroke, and only points having an angular transformation of a predetermined size or more within the stroke. For example, the processor 270 may normalize the angle change inside the stroke.

Figure 6:
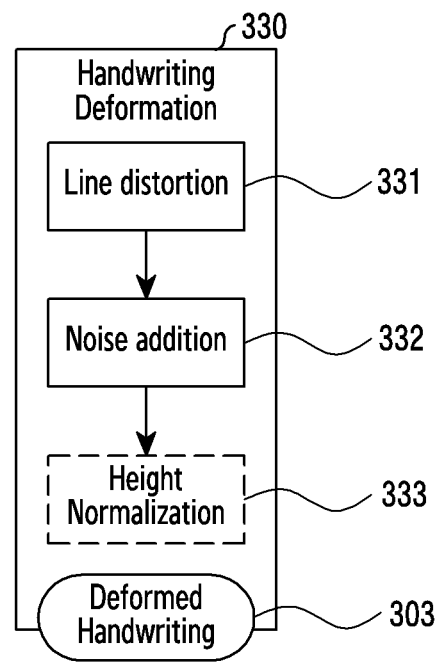
FIG. 6 is a diagram illustrating an example process of deforming handwriting data according to various embodiments.
Figure 7:
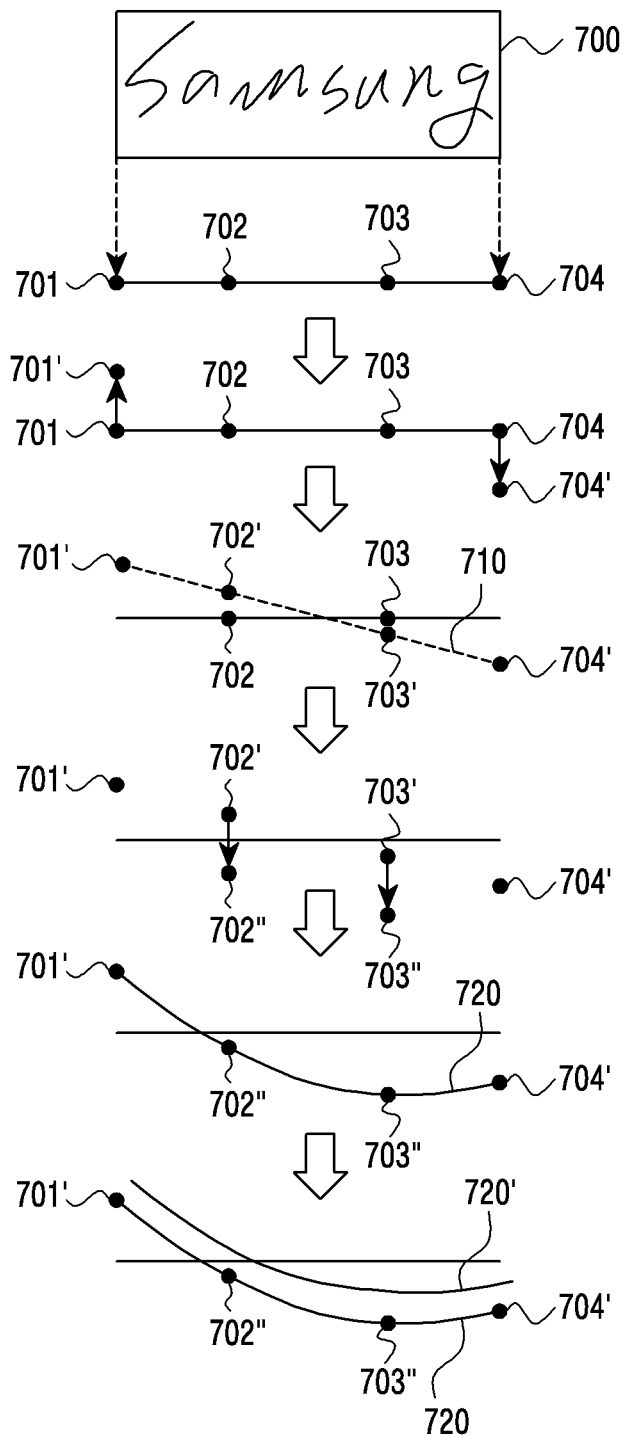
FIG. 7 is a diagram illustrating an example line distortion process during a process of deforming handwriting data according to various embodiments.
Figure 8:
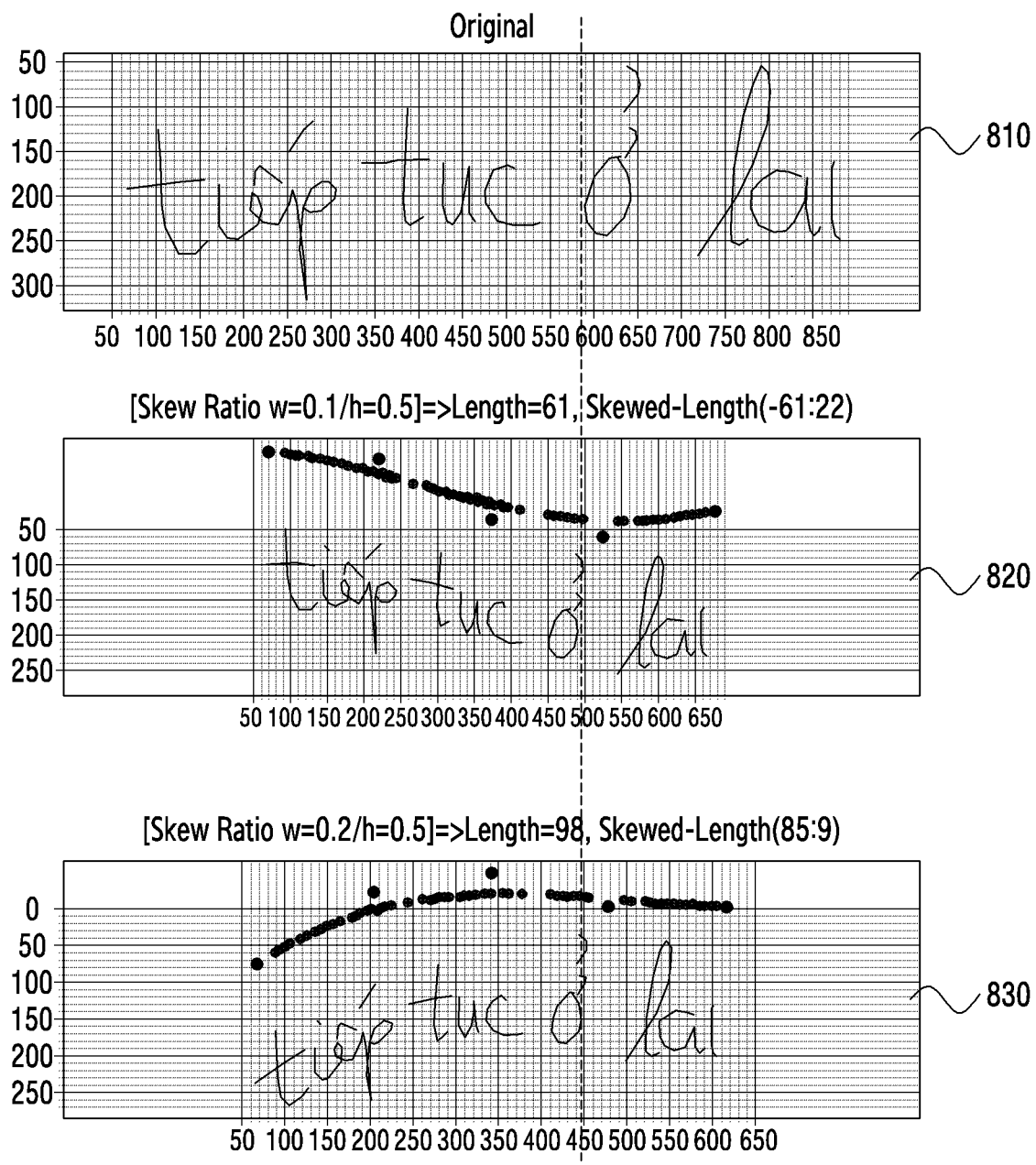
FIG. 8 is a diagram illustrating an example result of a line distortion process according to various embodiments.

FIG. 6 is a diagram illustrating an example process of deforming handwriting data according to various embodiments, FIG. 7 is a diagram illustrating an example line distortion process during a process of deforming handwriting data according to various embodiments, and FIG. 8 is a diagram illustrating an example result of a line distortion process according to various embodiments.

Referring to FIGS. 6, 7 and 8, a processor 270 of an electronic device (e.g., the electronic device 200 of FIG. 2) may deform (330) handwriting data 300 (or preprocessed handwriting data 301 preprocessing the handwriting data 300) that is the source (or original) data for learning to obtain distorted handwriting data 303 that becomes input handwriting data for learning the inference model 309. According to an embodiment, the processor 270 may perform line distortion (331), noise addition (332), and height normalization (333) for the handwriting data 300 (or the preprocessed handwriting data 301). However, the process of transforming the handwriting data 300 is not limited thereto. According to various embodiments, the process of deforming the handwriting data 300 may omit at least one of the detailed processes described above, and may further include at least one other detailed process. For example, the processor 270 may not perform the height normalization (333) processing on the handwriting data 300.

As shown in FIGS. 7 and 8, the processor 270 may perform a line distortion (331) process on the handwriting data 700 (e.g., handwriting data 300 or preprocessed handwriting data 301) to learn line level handwriting tilt and non-linear distortion. When explaining the process of the line distortion (331), the processor 270 may generate seed control points 701, 702, 703, and 704 that are reference based on the handwriting data 700. The control points 701, 702, 703, and 704 may be selected from points of a line segment indicating a slope of the handwriting data 700, for example. For example, the control points 701, 702, 703, and 704 may include points 701 and 704 at the outermost points of the line segment, and points 702 and 703 at positions having a predetermined distance from the outermost points 701 and 704 on the line segment.

After the control points 701, 702, 703, and 704 are generated, the processor 270 may change positions of at least some of the control points 701, 702, 703, and 704. As an example, the processor 270 may change the location of the first control point 701 and the location of the fourth control point 704 at the outermost of the control points 701, 702, 703, and 704. Although FIG. 7 illustrates a state in which the first control point 701 moves upward (or moves in the (+) direction of the y-axis) to become the 1-1st control point 701', and the fourth control point 704 is moved downward (or moved in the (−) direction of the y-axis) to become the 4-1st control point 704', the moving control point and the moving direction are not limited thereto.

The processor 270 may calculate a linear slope 710, based on the control points 701', 702, 703, 704' after at least some of the control points 701, 702, 703, and 704 have been changed in position. For example, the processor 270 may calculate the linear slope 710, based on the 1-1st control point 701' and the 4-1st control point 704' at the outermost of the control points 701', 702, 703, and 704' after the positions are changed. In addition, the processor 270 may also change the positions of other control points (e.g., the second control point 702 and the third control point 703) through interpolation processing, based on the linear slope 710. For example, the second control point 702 may be moved on a line segment representing the linear slope 710 to become a 2-1st control point 702', and the third control point 703 may also be moved on the line segment indicating the linear slope 710 to become the 3-1st control point 703'.

In order to distort the handwriting data 700 non-linearly, the processor 270 may change (or re-change) the position of at least some of the control points 701', 702', 703', and 704' whose positions are changed. For example, the processor 270 may change the position of the 2-1st control point 702' and the position of the 3-1st control point 703' among the control points 701', 702', 703', and 704'. Although FIG. 7 illustrates a state in which the 2-1st control point 702' is moved downward (or moved in the (−) direction of the y-axis) to become the 2-2nd control point 702", and the 3-1st control point 703' is moved downward (or moved in the (−) direction of the y-axis) to become the 3-2nd control point 703", the moving control point and the moving direction are not limited thereto.

The processor 270 may generate a first curve 720, based on the control points 701', 702", 703", and 704' after the positions of at least some of the control points 701', 702', 703', 704' are changed (or re-changed). For example, the processor 270 may generate the first curve 720 connecting the 1-1st control point 701', the 2-2nd control point 702", the 3-2nd control point 703", and the 4-1st control point 704' whose locations are changed (or re-changed). According to an embodiment, the first curve 720 may include the Bezier curve smoothly connecting the 1-1st control point 701', the 2-2nd control point 702", and the 3-2nd control point 703", and the 4-1st control point 704'.

The processor 270 may change the position of the first curve 720. For example, the processor 270 may change the position of the first curve 720 so that the center point of the first curve 720 is located on a line segment indicating the slope of the handwriting data 700. FIG. 7 illustrates a state in which the first curve 720 is moved upward (or moves in the (+) direction of the y-axis) to become the second curve 720' so that the center point of the first curve 720 is positioned on a line segment representing the slope of the handwriting data 700 (e.g., y-axis coordinate value=0), but the moving value and the moving direction are not limited thereto.

When the second curve 720' is obtained, the processor 270 may deform the handwriting data 700, based on the second curve 720'. For example, the processor 270 may change positions of points of the handwriting data 700 according to the second curve 720'. Accordingly, the handwriting data 700 may be distorted into the distorted handwriting data 303 having a nonlinear slope indicated by the second curve 720'. In addition, in the above-described line distortion 331 process, by variously applying the position change and re-change of the control points 701, 702, 703, and 704, and the generation and position change of the curve 720, as in FIG. 8, so that a plurality of pieces of distorted handwriting data 820 and 830 may be obtained using one piece of handwriting data 810 (e.g., handwriting data 700). FIG. 8 illustrates a state in which one piece of handwriting data 810 is non-linearly distorted to obtain first distorted handwriting data 820 and second distorted handwriting data 830, but the form of distortion and the number of the obtained handwriting data are not limited thereto.

The processor 270 may generate (or obtain) distorted handwriting data 303 by changing at least one of the position or angle of at least one letter of the handwriting data 300 (or the preprocessed handwriting data 301 preprocessed with the handwriting data 300) through the deformation 330 process of the handwriting data 300 (or the pre-processed handwriting data 301 preprocessed with the handwriting data 300).

Figure 9:
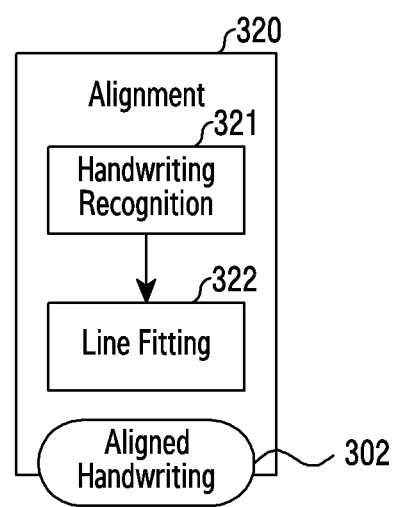
FIG. 9 is a diagram illustrating an example process of aligning handwriting data according to various embodiments.
Figure 10:
FIG. 10 is a diagram illustrating an example reference line of handwriting data according to various embodiments.
Figure 11:
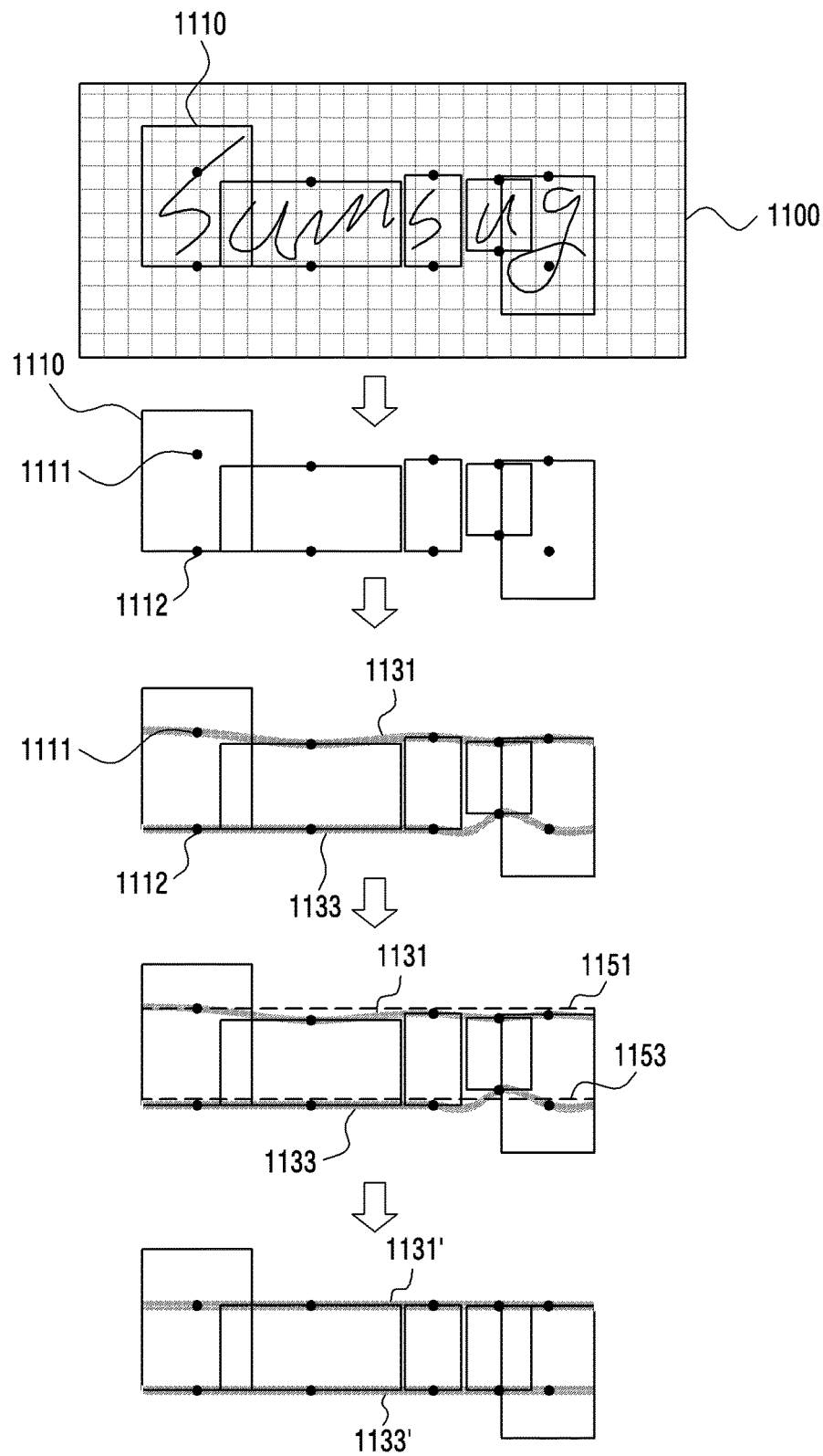
FIG. 11 is a diagram illustrating an example line fitting process during a process of aligning handwriting data according to various embodiments.
Figure 12:
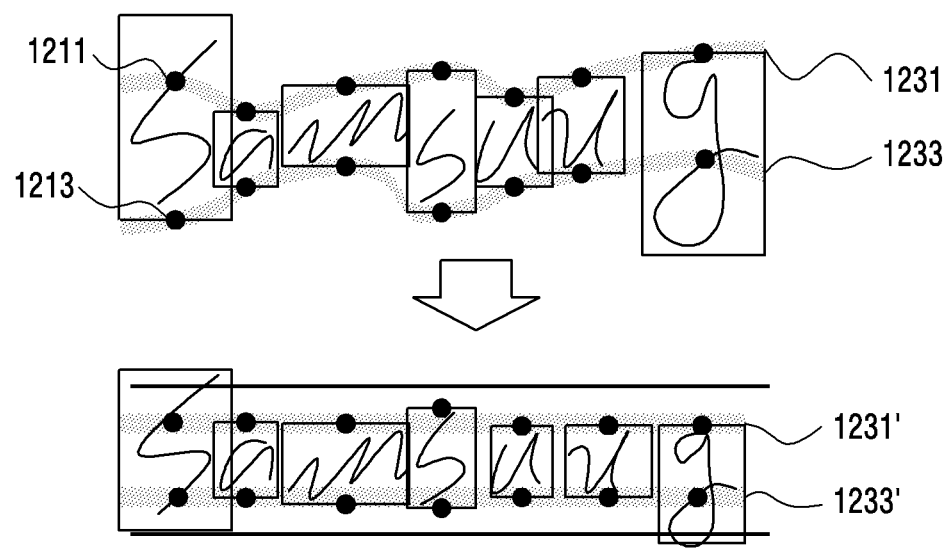
FIG. 12 is a diagram illustrating an example result of a line fitting process according to various embodiments.
Figure 13:
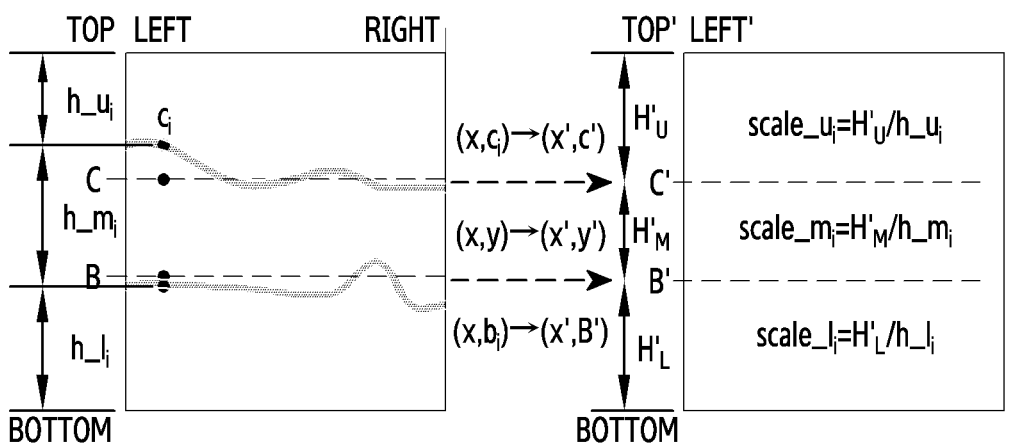
FIG. 13 is a diagram illustrating an example alignment process in consideration of a reference line of handwriting data according to various embodiments.

FIG. 9 is a diagram illustrating an example process of aligning handwriting data according to various embodiments, FIG. 10 is a diagram illustrating an example reference line of handwriting data according to various embodiments, FIG. 11 is a diagram illustrating an example line fitting process during a process of aligning handwriting data according to various embodiments, FIG. 12 is a diagram illustrating an example result of a line fitting process according to various embodiments, and FIG. 13 is a diagram illustrating an example alignment process in consideration of a reference line of handwriting data according to various embodiments.

Referring to FIGS. 9, 10, 11, 12 and 13, a processor 270 of an electronic device (e.g., the electronic device 200 of FIG. 2) may define target handwriting data that is a target to restore (or correct) input handwriting data (e.g., distorted handwriting data 303). According to an embodiment, the processor 270 may align (320) the handwriting data 300 (or the pre-processed handwriting data 301 preprocessed with the handwriting data 300), which is the source (or original) data of learning, and designate the aligned handwriting data 302 obtained through the alignment 320 process as the target handwriting data.

When explaining the process of alignment 320, the processor 270 may perform handwriting recognition 321 and line fitting 322 on the handwriting data 300 (or the preprocessed handwriting data 301).

The processor 270 may determine a region of each letter of the handwriting data 300 (or the pre-processed handwriting data 301) through the handwriting recognition 321 process, and select key points of each letter based on a boundary line indicating the area. For example, the processor 270 may select a center point of an upper boundary line and a center point of a lower boundary line as the main points among boundary lines representing an area of each letter.

The processor 270 may extract a writing effective area inside a letter for selecting a meaningful part of the handwriting (e.g., an inner center area). For example, the processor 270 may select a meaningful part of the handwriting by removing an abnormally long written part. In this case, the main points of each letter may be moved to the boundary line indicating the selected significant part. For example, the center point of the upper boundary line among the main points may move downward (or move in the (−) direction of the y-axis), and the center point of the lower boundary line among the main points may move upward (or move in the (+) direction of the y-axis). According to an embodiment, the processor 270 may analyze the histogram distribution of each letter area to extract a writing effective area inside the letter at a predetermined ratio. For example, the processor 270 may extract the writing effective area by excluding the upper area and/or the lower area from the area of each letter at a predetermined ratio (e.g., 5%).

The processor 270 may configure a reference line of the handwriting, and perform line fitting 322 on the letters included in the handwriting, based on the reference line. For example, the processor 270 may unify the fitting position even if the language (or letter code) of the letters of the handwriting data 300 (or the pre-processed handwriting data 301) is mixed and used, and in order to extract the central axis of the inclination as a feature, may estimate a virtual reference line and use the same as a reference position for feature extraction. Referring to FIG. 10, the reference line may include, for example, a corpus line 1010 and a base line 1020 according to a type (or kind) of a letter. That is, the processor 270 may correct the upper and lower positions of the main points using a reference line (e.g., the corpus line 1010 and the base line 1020) according to the type (or kind) of the recognized letter as an expected position. For example, the processor 270 may move the center point located on the upper boundary line to the corpus line 1010 (downward), and move the center point located at the lower boundary line to the base line 1020 (upward), using the recognized letter code (e.g. Unicode) information.

In the method of estimating the reference line, the processor 270 may classify a type of letter according to a code of the letter. For example, the processor 270 may classify the type of the letter into a type in which the letter is located at the upper boundary line, a type in which the letter is located between the upper boundary line and the corpus line 1010, a type in which the letter is located at the corpus line 1010, a type in which the letter is located at the center line, a type in which the letter is located at the base line 1020, a type in which the letter is located between the base line 1020 and a lower boundary line, and a type in which the letter is located at the lower boundary line. In addition, the processor 270 may classify the type of the letter according to the position of the letter, and estimate the positions of the corpus line 1010 and the base line 1020 according to the position of the letter from a boundary line representing the area of the letter (e.g., a circumscribed rectangle surrounding the area).

Referring to FIGS. 11 and 12, when the line fitting 322 process is described, the processor 270 may determine an area 1110 of each letter of the handwriting data 1100 and 1210 (e.g., handwriting data 300 or preprocessed handwriting data 301), and select main points 1111, 1112, 1211, and 1213 of each letter, based on a boundary line indicating the area 1110. For example, the processor 270 may select a center point of an upper boundary line and a center point of a lower boundary line as the main points 1111, 1112, 1211, and 1213 among boundary lines representing the area 1110 of each letter. According to an embodiment, the processor 270 may correct the upper and lower positions of the main points 1111, 1112, 1211, and 1213 with the corpus line 1151 (e.g., the corpus line 1010) and the base line 1153 (e.g., the base line 1020) of the handwriting data 1100, 1210. For example, the processor 270 may move a center point (e.g., upper main points 1111, 1211) located on the upper boundary line to the corpus line 1151 (downward), and move a center point (e.g., lower main points 1112 and 1213) located on the lower boundary line to the base line 1153 (upward).

The processor 270 may generate curves 1131, 1133, 1231, and 1233 connecting the main points 1111, 1112, 1211, and 1213 of each letter. As an example, the processor 270 may generate first Bezier curves 1131 and 1231 smoothly connecting the upper main points 1111 and 1211 of each letter, and second Bezier curves 1133 and 1233 smoothly connecting the lower main points 1112 and 1213 of each letter.

According to an embodiment, the processor 270 may configure a reference line of the handwriting data 1100 and 1210. For example, the processor 270 may configure the corpus line 1151 and the base line 1153 of the handwriting data 1100 and 1210. The corpus line 1151 and the base line 1153 may be reference lines in the vertical direction (or y-axis direction) of the handwriting data 1100 and 1210.

The processor 270 may align the main points 1111, 1112, 1211, and 1213 of each letter based on the reference line. That is, the processor 270 may align the main points 1111, 1112, 1211, and 1213 on the curves 1131, 1133, 1231, and 1233 to be positioned on the reference line. For example, the processor 270 may correct the position of the upper main points 1111 and 1211 to be positioned on the corpus line 1151, and correct the position of the lower main points 1112 and 1213 to be positioned on the base line 1153. When the main points 1111, 1112, 1211 and 1213 are aligned with respect to the reference line, the first Bezier curves 1131 and 1231 connecting the upper main points 1111 and 1211 may be transformed into first straight lines 1131' and 1231', and the second Bezier curves 1133 and 1233 connecting the lower main points 1112 and 1213 may be transformed into second straight lines 1133' and 1233'. That is, the main points 1111, 1112, 1211, 1213 on the curves 1131, 1133, 1231, 1233 may be aligned on the first straight line 1131' and 1231' and the second straight line 1133' and 1233'. Accordingly, the upper main points 1111 and 1211 and the lower main points 1112 and 1213 extracted for each letter are aligned to be positioned on the first straight lines 1131' and 1231' corresponding to the corpus line 1151 and on the second straight lines 1133' and 1233' corresponding to the line 1153, so that the letters of the handwriting data 1100 and 1210 can be evenly aligned. For example, as shown in FIG. 12, the processor 270 may obtain aligned handwriting data 1250 (e.g., aligned handwriting data 302) by aligning each letter of the handwriting data 1210.

According to an embodiment, the processor 270 may scale (or expand/reduce) the handwriting data 1100 and 1210 or shift the position of each letter of the handwriting data 1100 and 1210 according to an application purpose. That is, when the handwriting data 1100 and 1210 needs to be corrected to a specific position (e.g., row or column) according to an application purpose, the processor 270 may scale the handwriting data 1100 and 1210 or move the position of each letter. For example, the processor 270 may correct (or convert) the handwriting data 1100 and 1210 as they are. That is, the processor 270 may move the position of each letter of the handwriting data 1100 and 1210 within the writing area. As another example, the processor 270 may scale the handwriting data 1100 and 1210 while moving the position of each letter of the handwriting data 1100 and 1210.

FIG. 13 is a diagram illustrating an example equation for scaling the handwriting data 1100 and 1210 and moving the position of each letter. Referring to FIG. 13, the processor 270 may move the first position (xi, yi) of each letter of the first handwriting data while scaling first handwriting data having a first height (TOP-BOTTOM) and a first width (LEFT-RIGHT), so that the aligned second handwriting data can be obtained while the size is changed. In this case, the second handwriting data may have a second height (TOP'-BOTTOM) and a second width (LEFT'-RIGHT), and a position of each letter of the second handwriting data may be a second position (xi', yi').

The processor 270 may generate (or obtain) target handwriting data by aligning at least one letter of the handwriting data 300 (or the preprocessed handwriting data 301 preprocessed with the handwriting data 300) to a reference line (e.g., a corpus line and a base line) through the alignment 320 process of the handwriting data 300 (or the pre-processed handwriting data 301 preprocessed with the handwriting data 300).

Figure 14:
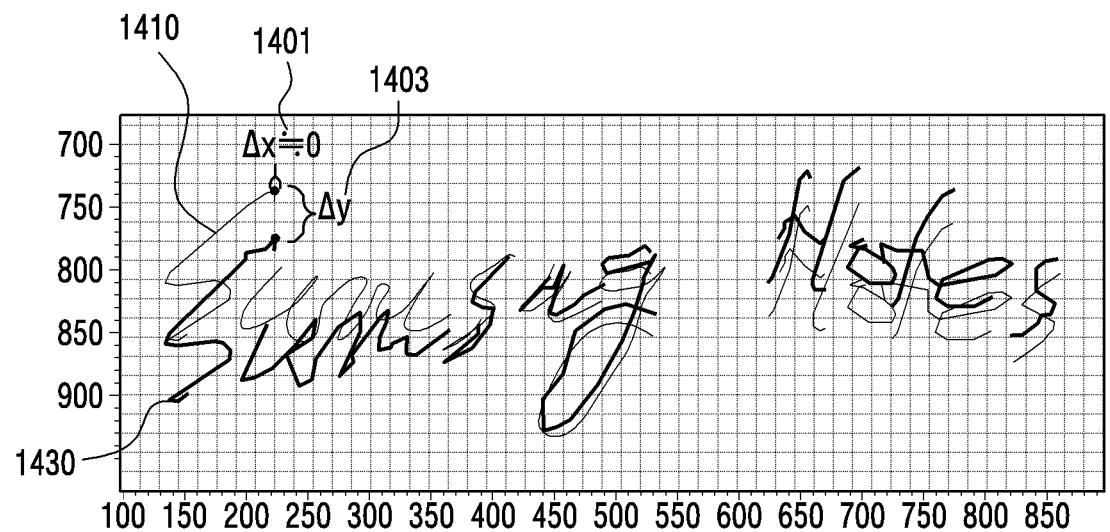
FIG. 14 is a diagram illustrating an example process of extracting feature points of handwriting data according to various embodiments.

FIG. 14 is a diagram illustrating an example process of extracting a feature point of handwriting data according to various embodiments.

Referring to FIG. 14, a processor 270 of an electronic device (e.g., the electronic deice 200 of FIG. 2) may perform feature extraction (340 and 350) from target handwriting data 1410 (e.g. source handwriting data 300, preprocessed handwriting data 301 or aligned handwriting data 302) and input handwriting data 1430 (e.g. distorted handwriting data 303). For example, the processor 270 may extract (340) target feature data 304 from the target handwriting data 1410, and extract (350) input feature data 305 from the input handwriting data 1430.

According to an embodiment, the processor 270 may extract input feature data 305 for respective points of the input handwriting data 1430. The input feature data 305 may include information on which each point is arranged on the handwriting of the input handwriting data 1430, information indicating a regional relationship between any one point and surrounding points, and information related to the start and end of a stroke of the handwriting. For example, the input feature data 305 may include an x-axis coordinate value (the x-axis position value of each point with respect to the handwriting width) and an a y-axis coordinate value (the y-axis position value of each point with respect to the handwriting height) of each point on the handwriting of the input handwriting data 1430, x-axis intervals and y-axis intervals with adjacent points, For example, the input feature data 305 includes x-axis intervals and y-axis intervals with adjacent points, information about whether each point is a start point of a stroke (true/false), and information about whether each point is an end point of a stroke (true/false). The size (or number) of the input feature data 305 may have a size (or number) equal to a value obtained by multiplying the number of points by the number of features. In an embodiment, the processor 270 may use only a portion of the input feature data 305 to reduce system complexity and improve inference speed.

According to an embodiment, the processor 270 may extract target feature data 304 for respective points of the target handwriting data 1410. The target feature data 304 may include information on the positional relationship between each point (target point) on the handwriting of the target handwriting data 1410 and each point (input point) on the handwriting of the input handwriting data 1430 corresponding thereto. For example, the target feature data 304 may include information on an x-axis interval 1401 and a y-axis interval 1403 of the target point and the input point corresponding thereto. According to an embodiment, the processor 270 may exclude a feature of the x-axis interval 1401 having a relatively small correction effect and use only the feature of the y-axis interval 1403 to reduce the complexity of the system and improve inference speed.

According to an embodiment, the processor 270 may normalize (370, 380) the target feature data 304 and the input feature data 305. For example, the processor 270 may normalize (370) the target feature data 304 to obtain the normalized target feature data 307, and normalize (380) the input feature data 305 to obtain the normalized input feature data 308.

According to an embodiment, the processor 270 may calculate (360) a normalization vector 306 using the target feature data 304 and the input feature data 305. For example, the processor 270 may calculate (360) at least one of an average or standard deviation of each of the target feature data 304 and the input feature data 305. Further, the processor 270 may store the normalization vector 306 in a memory 290. According to an embodiment, the normalization vector 306 obtained through the calculation (360) process may be used in the process of normalizing (370, 380) the target feature data 304 and the input feature data 305.

Figure 15:
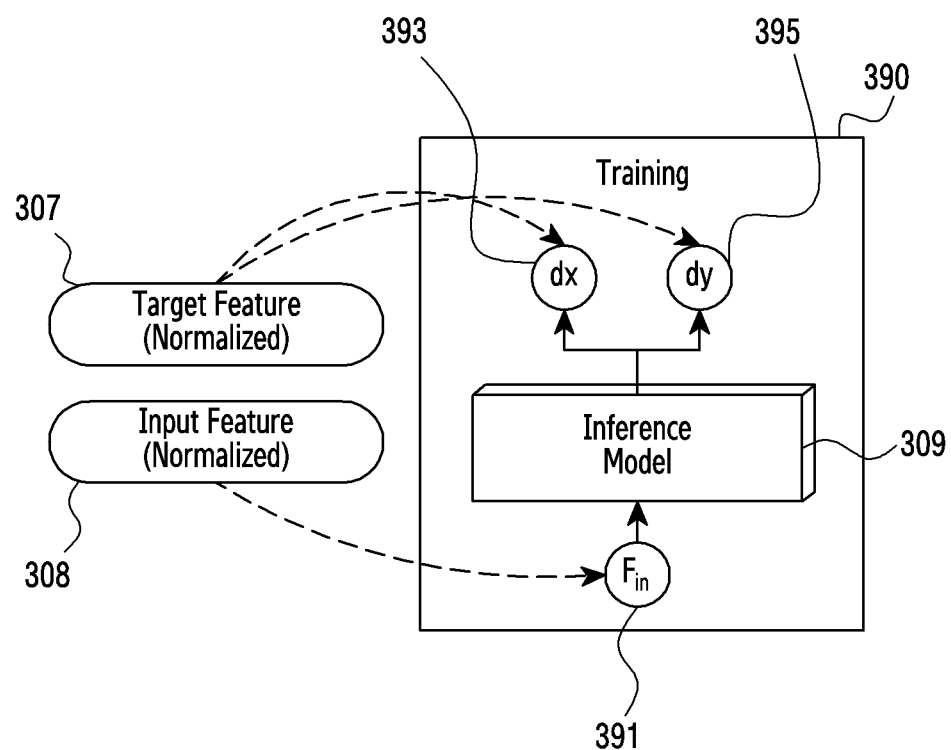
FIG. 15 is a diagram illustrating an example data learning process for correcting distortion of handwriting data according to various embodiments.
Figure 16A:
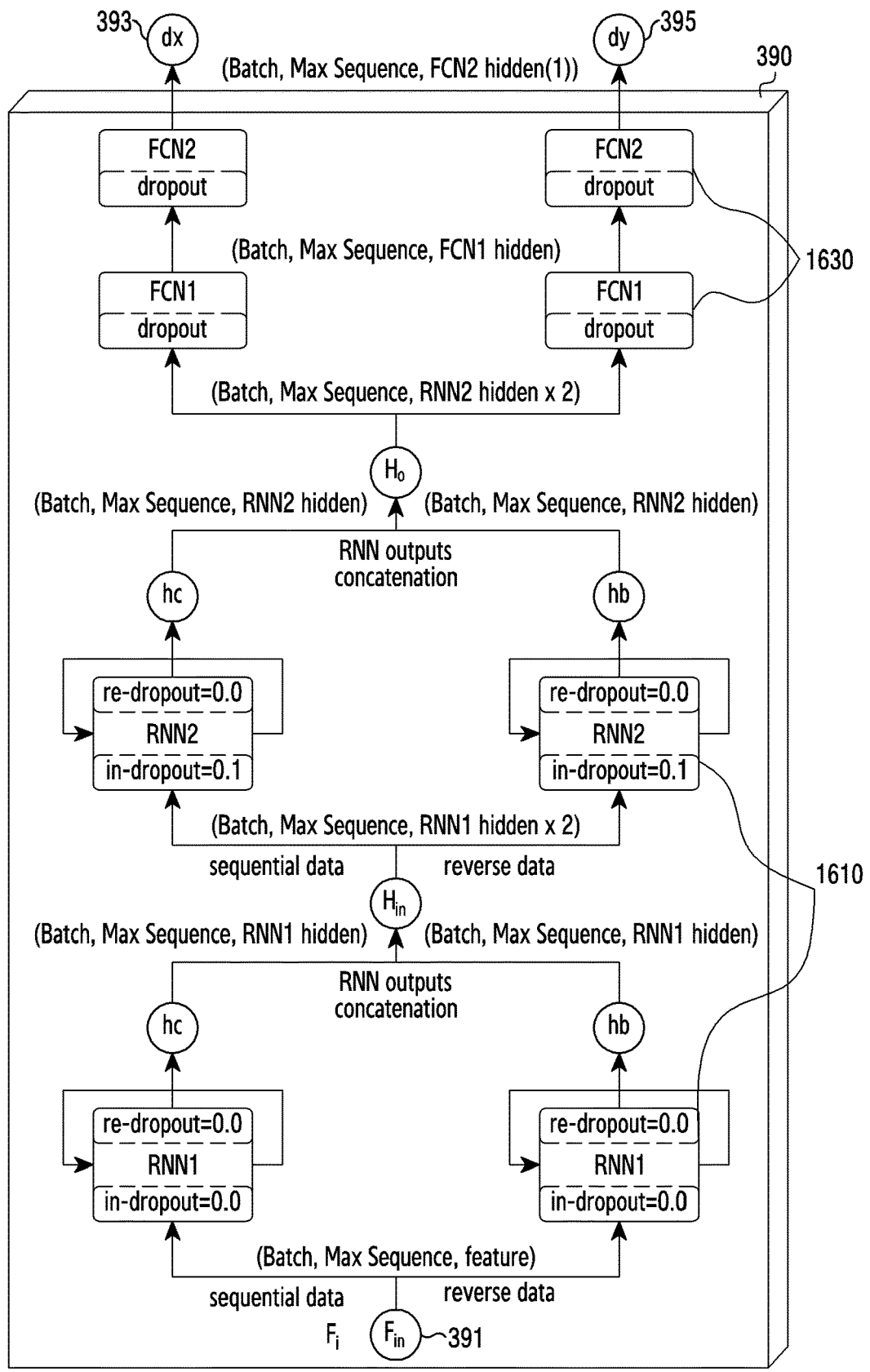
FIG. 16A is a diagram illustrating an example deep learning-based learning process according to various embodiments.
Figure 16B:
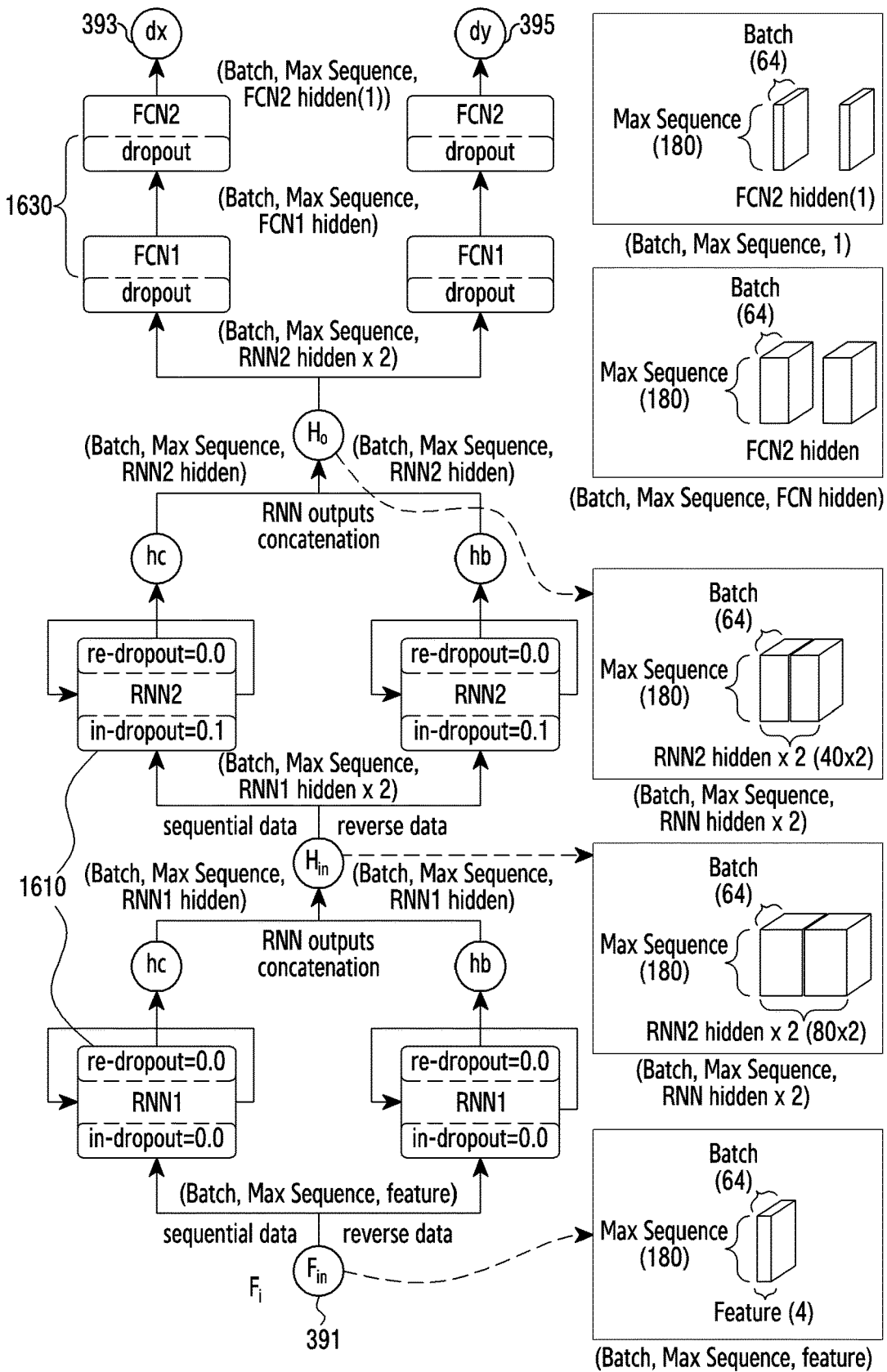
FIG. 16B is a diagram illustrating an example deep learning-based learning process according to various embodiments.
Figure 17:
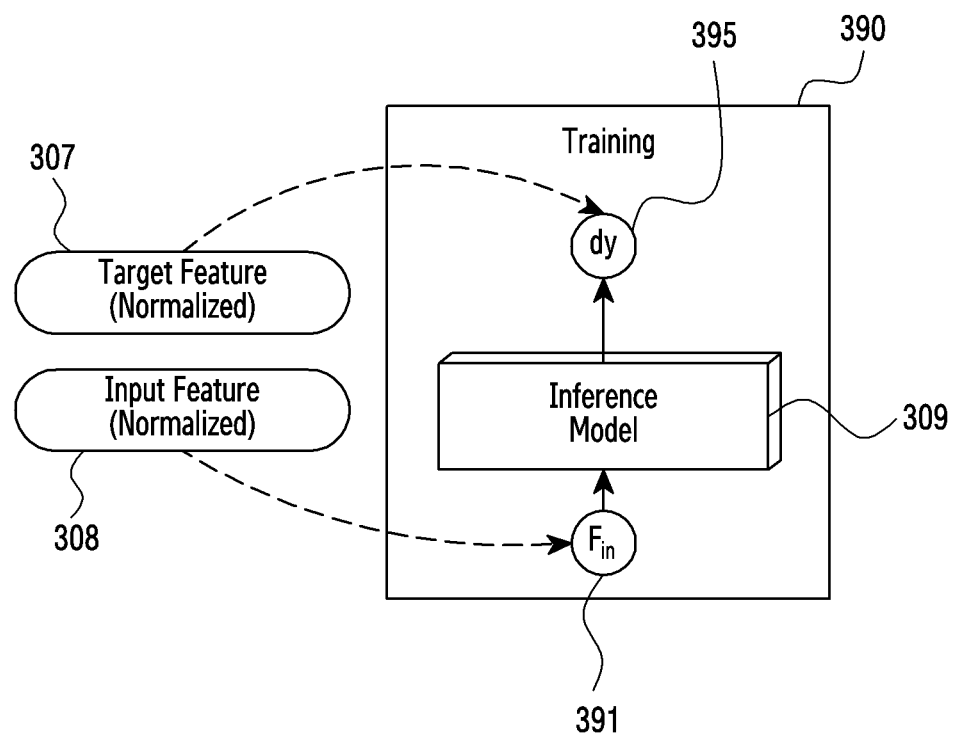
FIG. 17 is a diagram illustrating an example simplified learning process of data for correcting distortion of handwriting data according to various embodiments.
Figure 18:
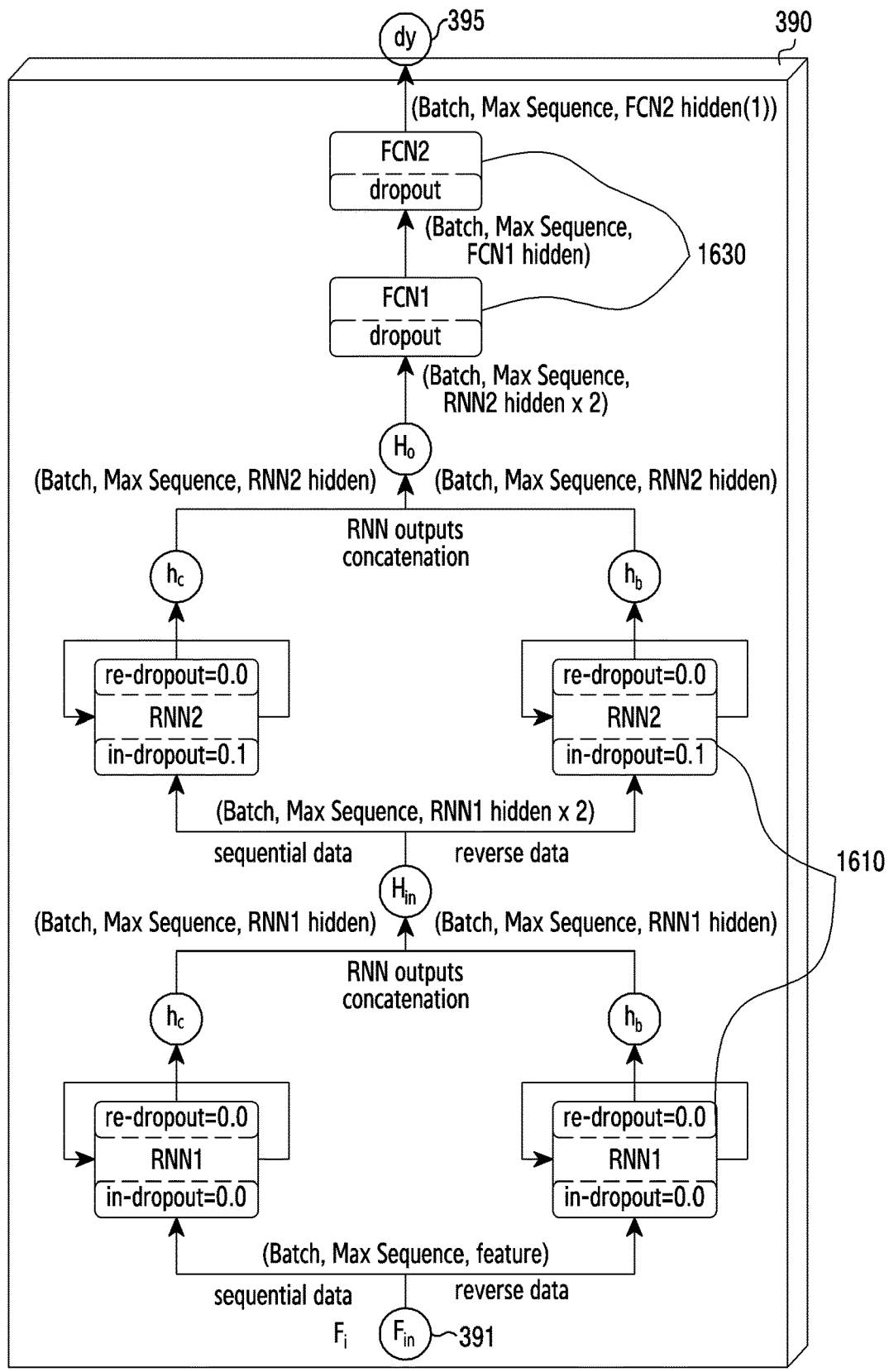
FIG. 18 is a diagram illustrating an example simplified learning process, based on deep learning according to various embodiments.

FIG. 15 is a diagram illustrating an example data learning process for correcting distortion of handwriting data according to various embodiments, FIG. 16A is a diagram illustrating an example deep learning-based learning process according to various embodiments, FIG. 16B is a diagram illustrating an example deep learning-based learning process according to various embodiments, FIG. 17 is a diagram illustrating an example simplified learning process of data for correcting distortion of handwriting data according to various embodiments, and FIG. 18 is a diagram illustrating an example simplified learning process, based on deep learning according to various embodiments.

Referring to FIGS. 15, 16A, 16B, 17 and 18, a processor 270 of an electronic device (e.g., the electronic device 200 of FIG. 2) may learn (390) the inference model 309 using the normalized target feature data 307 and the normalized input feature data 308 (or the target feature data 304 and the input feature data 305). For example, the processor 270 may learn (390) the inference model 309 for restoring (or correcting) the normalized input feature data 308 (or the input feature data 305) to the normalized target feature data 307 (or the target feature data 304). That is, the normalized input feature data 308 (or the input feature data 305) may be the input (Fin) 391 of the inference model 309, and the normalized target feature data 307 (or the target feature data 304) may be the outputs (dx, dy) 393 and 395 of the inference model 309.

According to an embodiment, the processor 270 may learn (390) the inference model 309 through a deep learning-based algorithm. The deep learning-based algorithm may include, for example, a deep neural network algorithm having a recurrent neural network (RNN) structure for effectively processing continuous data. The processor 270 may bi-directionally combine a recurrent neural network for continuous data processing so that it can be learned by referring to neighboring points (adjacent points) before/after the currently processed point, and may stack them in one or more layers to extract effective features. In addition, the processor 270 may add one or more fully-connected network (FCN) layers for calculating a final output value (correction value).

Referring to FIGS. 16A and 16B, describing the deep learning-based algorithm, the inference model 309 may include a recurrent neural network (RNN) layer 1610 and a fully-connected network (FCN) layer (or a dense layer).

The recurrent neural network layer 1610 may receive input feature data 308 of a size obtained by multiplying a batch size, a sequence size, and an input feature size of the input feature data 308 as input. Here, the batch size may represent the number of training samples to be learned at one time, the sequence size may represent the maximum number of points of the handwriting, and the size of the input feature data 308 may represent the number of features of the input feature data 308. According to an embodiment, the recurrent neural network layer 1610 may use an existing recurrent neural network structure (e.g., long short-term memory (LSTM) or an existing gated recurrent unit (GRU)).

According to an embodiment, the recurrent neural network layer 1610 may have a recurrent neural network in a forward direction and a recurrent neural network in a reverse direction in pairs. The recurrent neural network layer 1610 may merge outputs through two recurrent neural networks configured as a pair to output recurrent neural network operation data having a size obtained by multiplying all of a batch size, a sequence size, and a sum of two RNN hidden sizes. Here, the hidden size of the recurrent neural network may represent the size of a hidden unit of the recurrent neural network of the corresponding layer. The outputted recurrent neural network operation data may be an input of another recurrent neural network layer 1610. For example, the output of the first recurrent neural network layer may be an input of the second recurrent neural network layer. In other words, the recurrent neural network layer 1610 may include a plurality of layers, and may have a structure in which an output of a lower recurrent neural layer is an input of an upper recurrent neural network layer. In this case, each recurrent neural network layer may have a different size of the hidden unit. In addition, the recurrent neural network layer 1610 may include an appropriate number (e.g., two) in consideration of processing time constraints and operational efficiency of the algorithm. Finally, the size of the output from the recurrent neural network layer at the top layer may be a size obtained by multiplying all of the batch size, the sequence size, and the sum of the recurrent neural network hidden sizes.

The FCN layer 1630 may receive an output of the recurrent neural network layer 1610 of the uppermost layer as an input. The FCN layer 1630 may output complete network operation data having a size obtained by multiplying all of the batch size, sequence size, and density hidden size having a specific number of hidden neurons. Here, the density hidden size may represent the size of the hidden unit of the complete network of the corresponding layer.

According to an embodiment, the FCN layer 1630 may include a plurality of layers, and the output of the lower complete connection network layer may be an input to the upper complete connection network layer. In this case, each complete network layer may have a different size of the hidden unit. In addition, the FCN layer 1630 may include an appropriate number (e.g., two) of layer in consideration of processing time constraints and operational efficiency of the algorithm. Finally, the size of the output in the FCN of the top layer may include one or two so that coordinate change values (dx, dy) 393 and 395 to be corrected are calculated. For example, FIGS. 15, 16A and 16B illustrate a state in which he coordinate change value to be corrected may include a two x-axis coordinate change value (dx) 393 and y-axis coordinate change value (dy) 395, and FIGS. 17 and 18 illustrate a state in which the x-axis coordinate change value (dx) (393) having a relatively small correction effect is excluded and the y-axis coordinate change value (dy) (395) may include one in order to reduce the complexity of the system and improve the inference speed.

The processor 270 may obtain correction information (e.g., training data 291) for correcting the distorted handwriting data to correspond to the target handwriting data through the learning 390 process. The correction information may include, for example, at least one of an inference model 309 and a normalization vector 306. Also, the processor 270 may store the obtained correction information in a memory 290.

Figure 19:
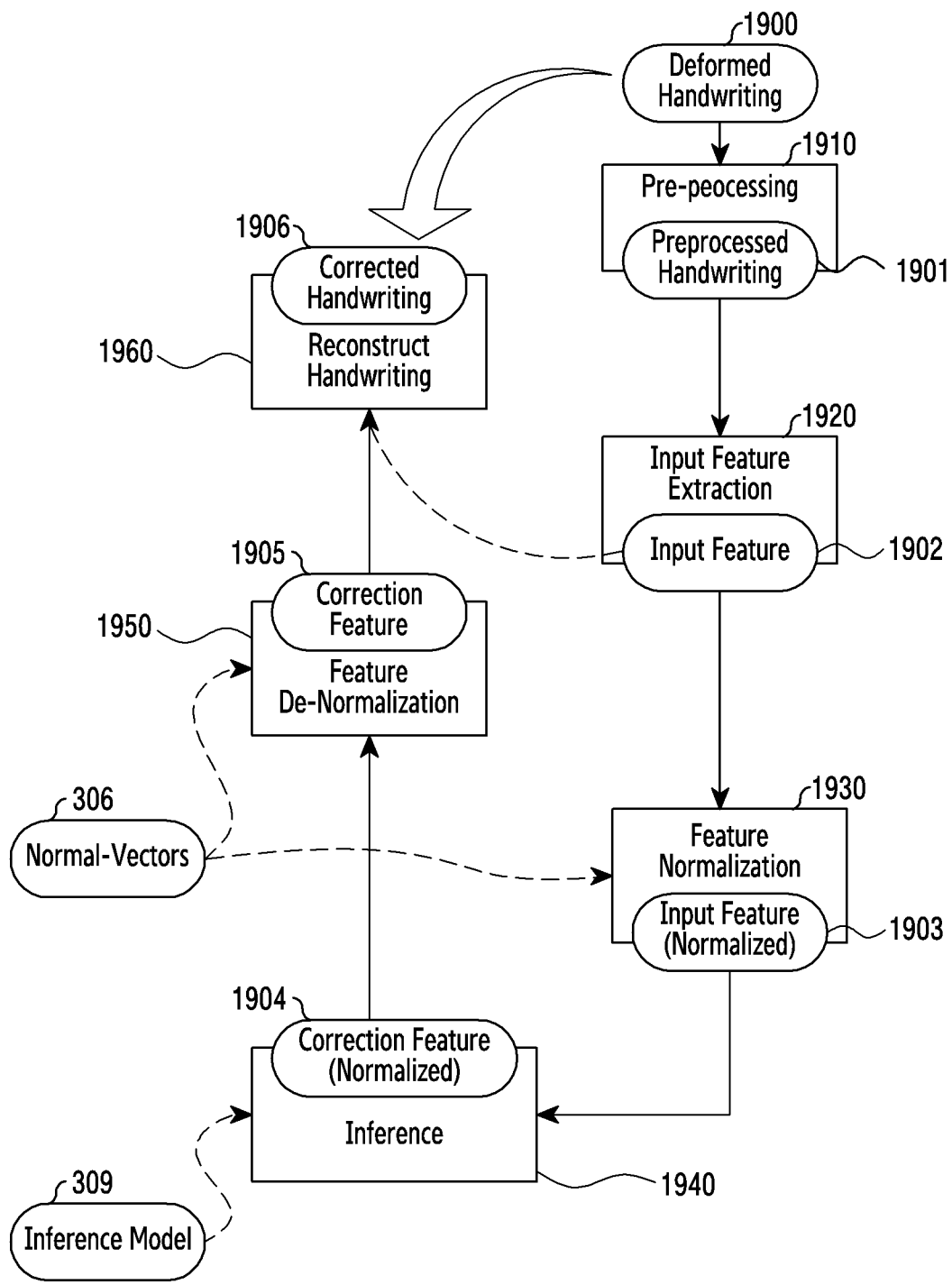
FIG. 19 is a diagram illustrating an example framework for correcting distortion of handwriting data, based on learning data according to various embodiments.

FIG. 19 is a diagram illustrating an example framework for correcting distortion of handwriting data, based on learning data according to various embodiments.

Referring to FIG. 19, a processor 270 of an electronic device (e.g., the electronic device 200 of FIG. 2) may recognize a handwriting input received through the input device 210. Further, the processor 270 may correct the distortion of the handwriting data 1900 when there is distortion or deformation in the handwriting data 1900 according to the recognized handwriting input. For example, when at least one letter included in the handwriting data 1900 is not aligned with the reference line, the processor 270 may change at least one of the position or angle of the at least one letter to align the same with the reference line. When correcting the distortion of the handwriting data 1900, the processor 270 may use the learning data 291 stored in the memory 290. The learning data 291 may include, for example, at least one of an inference model 309 and a normalization vector 306 learned through a learning process.

Looking at the process of correcting the distortion of the handwriting data 1900, when a handwriting input is received through the input device 210, the processor 270 may preload the inference model 309 and the normalization vector 306 stored in the memory 290, and may preprocess (1910) handwriting data 1900 according to the handwriting input. For example, the processor 270 may obtain the preprocessed handwriting data 1901 by performing a preprocessing such as height normalization or stroke simplification of the handwriting data 1900. Further, the processor 270 may perform feature extraction 1920 from the preprocessed handwriting data 1901 (or the handwriting data 1900). For example, the processor 270 may extract (1920) feature data 1902 from the preprocessed handwriting data 1901 (or the handwriting data 1900). In addition, the processor 270 may normalize (1930) the feature data 1902. For example, the processor 270 may normalize (1930) the feature data 1902 to obtain the normalized feature data 1903. According to an embodiment, the processor 270 may normalize (1930) the feature data 1902 using the normalization vector 306 stored in the memory 290 during a learning process. For example, the processor 270 may normalize (1930) the average of the feature data 1902 to be 0 and the standard deviation of the feature data 1902 to be 1. The preprocessing (1910), feature extraction (1920), and normalization (1930) processes for the handwriting data 1900 may be performed in the same or similar manner to the preprocessing (1910), feature extraction (1920), and normalization (1930) processes for the handwriting data 1900, preprocessing (310), feature extraction (340, 350), and normalization (370, 380) in the learning process.

The processor 270 may infer (or predict) (1940) a correction value through the inference model 309 using the normalized feature data 1903. The correction value may include, for example, normalized correction feature data 1904 obtained by correcting the normalized feature data 1903 through the inference model 309.

The processor 270 may perform denormalization (1950) to restore the normalized correction feature data 1904 output through the inference (1940) process back to the original feature value space. The processor 270 may obtain the correction feature data 1905 through the denormalization (1950) process for the normalized correction feature data 1904. According to an embodiment, the processor 270 uses the normalization vector 306 stored in the memory 290 during the learning process to perform the denormalization (1950) process for the normalized correction feature data 1904.

The processor 270 may correct distortion of the handwriting data 1900 by reconfiguring or reconstructing (1960) the handwriting data 1900 using the correction feature data 1904. According to an embodiment, the processor 270 may obtain the corrected handwriting data 1906 by reflecting the correction feature data 1904 on the handwriting data 1900 as it is. For example, the processor 270 may obtain the corrected handwriting data 1906 by applying (e.g., summing) an x-axis coordinate change value included in the correction feature data 1904 to the x-axis coordinate values of each of the points of the handwriting data 1900 and applying (e.g., summing) a y-axis coordinate change value included in the correction feature data 1904 to the y-axis coordinate values of each of the points of the handwriting data 1900. According to an embodiment, the processor 270 may obtain the corrected handwriting data 1906 by generating a transform table (or transform function), based on the correction feature data 1904 and reconfiguring (or correcting) the handwriting data 1900, based on the transform table. The method of using the conversion table will be described in greater detail below with reference to FIG. 22.

Figure 20:
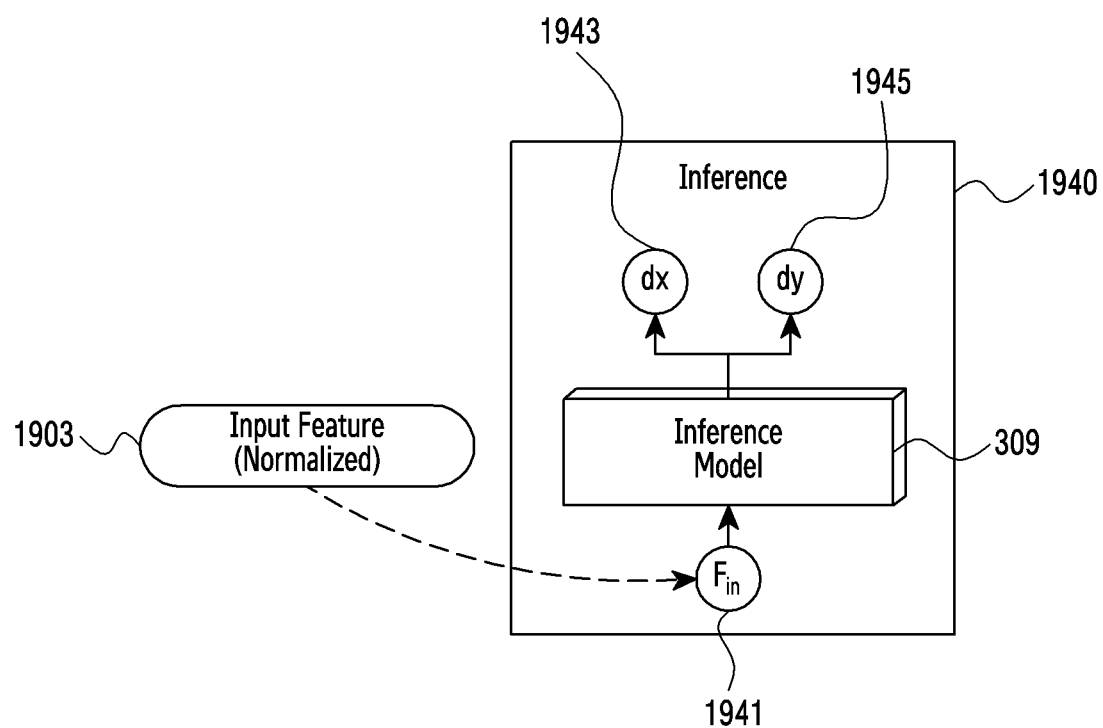
FIG. 20 is a diagram illustrating an example inference process for correcting distortion of handwriting data according to various embodiments.
Figure 21:
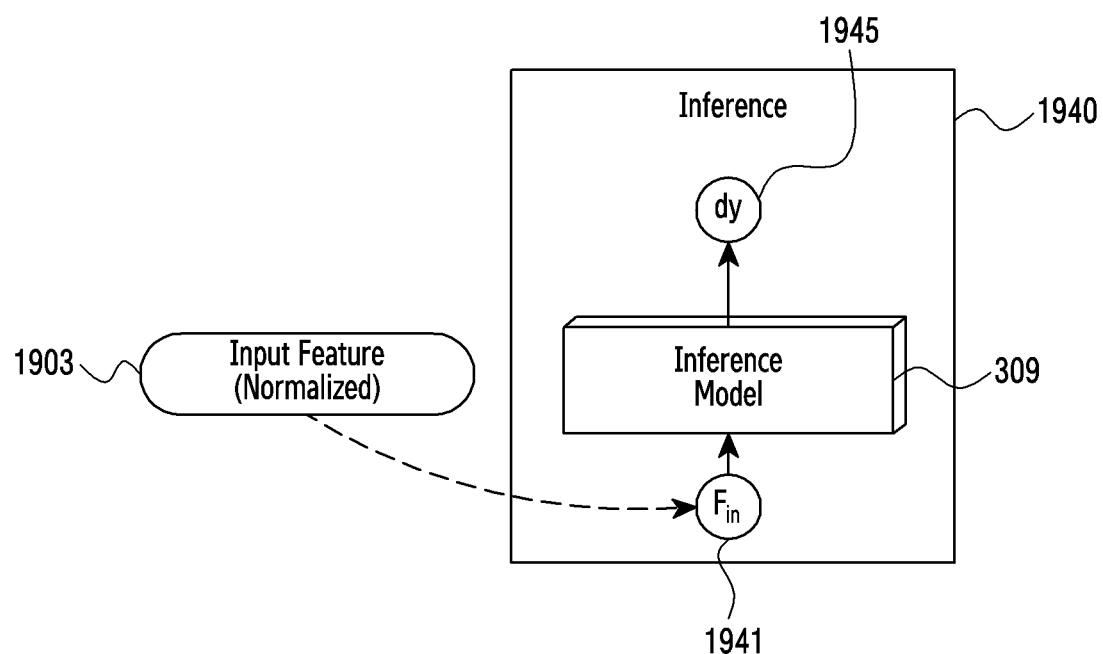
FIG. 21 is a diagram illustrating an example simplified inference process for correcting distortion of handwriting data according to various embodiments.

FIG. 20 is a diagram illustrating an example inference process for correcting distortion of handwriting data according to various embodiments, and FIG. 21 is a diagram illustrating an example simplified inference process for correcting distortion of handwriting data according to various embodiments.

Referring to FIGS. 20 and 21, a processor 270 of an electronic device (e.g., the electronic device 200 of FIG. 2) may infer (or predict) (1940) a correction value through the inference model 309 using the normalized feature data 1903. The normalized feature data 1903 may be the input (Fin) 1941 of the inference model 309, and the normalized correction feature data 1904 may be the outputs (dx, dy) 1943 and 1945 of the inference model 309. The outputs 1943 and 1945 of the inference model 309 may represent coordinate change values (dx, dy) to be corrected, and may include one or two. For example, FIG. 20 illustrates a state in which the coordinate change value to be corrected may include two x-axis coordinate change value (dx) 1943 and y-axis coordinate change value (dy) 1945, and FIG. 21 illustrates a state in which the x-axis coordinate change value (dx) 1943 having a relatively small correction effect is excluded and the y-axis coordinate change value (dy) 1945 is configured, to reduce the complexity of the system and speed up inference.

Figure 22:
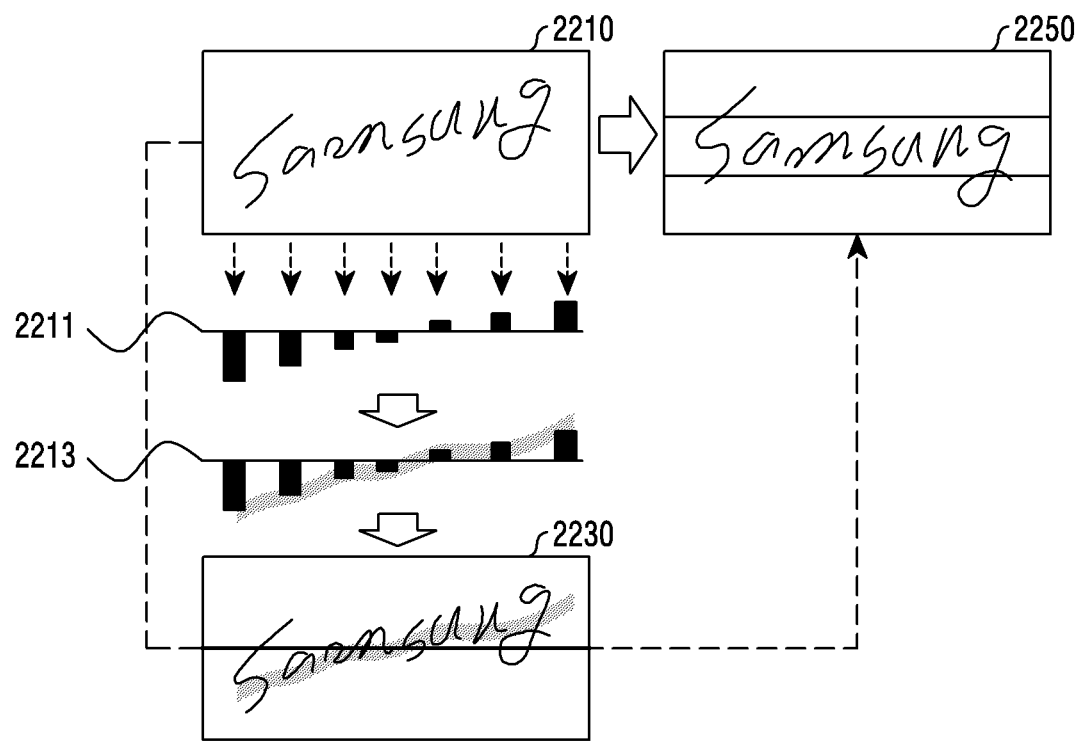
FIG. 22 is a diagram illustrating an example process of reconfiguring handwriting data according to various embodiments.

FIG. 22 is a diagram illustrating an example process of reconfiguring handwriting data according to various embodiments.

Referring to FIG. 22, a processor 270 of an electronic device (e.g., the electronic device 200 of FIG. 2) may correct distortion of the handwriting data 2210 by reconfiguring (1960) handwriting data 2210 (e.g., the handwriting data 1900) using the correction feature data 1904. According to an embodiment, the processor 270 may obtain the corrected handwriting data 2250 by generating a conversion table (or conversion function), based on the correction feature data 1904 and reconfiguring (or correcting) the handwriting data 2210, based on the conversion table. The correction method based on the conversion table is a method of modeling a peripheral distortion correction pattern so as not to cause sudden distortion, and may be a method of correcting the handwriting data 2210 by modeling the distribution of the correction feature data 1904.

Looking at the process of correcting the handwriting data 2210 based on the conversion table, the processor 270 may calculate (2211) the distribution of the y-axis coordinate change value dy for each x-axis coordinate of the correction feature data 1904. For example, the processor 270 may calculate (2211) an average of the y-axis coordinate change value dy for each x-axis coordinate. Thereafter, the processor 270 may interpolate (2213) the distribution of the y-axis coordinate change value dy for each x-axis coordinate. For example, the processor 270 may smooth the distribution using a moving average or Bezier curve fitting. Also, the processor 270 may generate the conversion table serving as a mapping function, based on the smoothed distribution. Thereafter, the processor 270 may obtain the corrected handwriting data 2250 by correcting distortion of the handwriting data 2230 based on the generated conversion table. For example, the processor 270 may change (or correct) the position of the x-axis coordinates of the points of the handwriting data 2230 according to the converted value of the y-axis coordinate change value dy obtained according to the conversion table.

As described above, according to various example embodiments, an electronic device (e.g., the electronic device 200 of FIG. 2) may include: a memory (e.g., the memory 290 of FIG. 2), and a processor (e.g., the processor 270 of FIG. 2) operatively connected to the memory. The memory may store instructions which, when executed, cause the processor to: obtain handwriting data including at least one letter; align the at least one letter with a reference line to generate target handwriting data; change at least one of a position or an angle of the at least one letter to generate distorted handwriting data; obtain correction information (e.g., the learning data 291 of FIG. 2) for correcting the distorted handwriting data to correspond to the target handwriting data; and store the correction information in the memory.

According to various example embodiments, the instructions may, when executed, cause the processor to: generate a plurality of points as a reference from the handwriting data; change a first position of at least one of the plurality of points; calculate or determine a linear slope, based on the plurality of points after the first position of the at least one point is changed; change a second position of at least one other point whose position is not changed among the plurality of points through interpolation processing based on the linear slope; change a third position of at least one of the plurality of points after the second position of the other at least one point is changed; generate a curve, based on the plurality of points based on the third position of the at least one point being changed; and generate the distorted handwriting data by changing positions of points of the handwriting data along the curve.

According to various example embodiments, the instructions, when executed, may cause the processor to: determine an area of the at least one letter; select main points of the at least one letter, based on a boundary line representing the area; and generate the target handwriting data by aligning the main points to be located on the reference line. The reference line may include a corpus line and a base line of the handwriting data.

According to various example embodiments, the instructions, when executed, may cause the processor to generate the target handwriting data by changing at least one of a height and a width of the handwriting data and aligning the main points to be located on the reference line.

According to various example embodiments, the instructions, when executed, may cause the processor to: extract first feature data from the distorted handwriting data; extract second feature data from the target handwriting data; normalize the first feature data and the second feature data; and calculate a normalization vector included in the correction information using the normalized first feature data and the normalized second feature data.

According to various example embodiments, the first feature data may include arrangement information of each of first points of the distorted handwriting data, information representing a regional relationship between each of the first points and neighboring points, and information representing whether each of the first points is a start point or an end point of a stroke, and the second feature data may include information on a positional relationship between each of second points of the target handwriting data and each of the first points corresponding to each of the second points.

According to various example embodiments, the instructions, when executed, may cause the processor to learn an inference model included in the correction information through a deep learning-based algorithm using the normalized first feature data and the normalized second feature data.

According to various example embodiments, the inference model may be trained to output the normalized second feature data by taking the normalized first feature data as input, and may include at least one first layer in which recurrent neural networks are bidirectionally combined and a second layer for outputting a coordinate change value to be corrected by merging outputs of the at least one first layer.

As described above, according to various example embodiments, an electronic device (e.g., the electronic device 200 of FIG. 2) may include: an input module comprising input circuitry (e.g., the input device 210 of FIG. 2), a memory (e.g., the memory 290 of FIG. 2) including correction information (e.g., the learning data 291 of FIG. 2) for correcting at least one of a position or an angle of at least one letter included in each of a plurality of handwriting data, and a processor (e.g., the processor 270 of FIG. 2) operatively connected to the input module and the memory. The memory may store instructions which, when executed, cause the processor to: receive a handwriting input through the input module; determine whether at least one letter included in handwriting data corresponding to the handwriting input is aligned with a reference line; and based on the at least one letter not being aligned with the reference line, change at least one of a position or an angle of the at least one letter to align with the reference line, based on the correction information stored in the memory.

According to various example embodiments, the instructions, when executed, may cause the processor to: extract first feature data from the handwriting data; normalize the first feature data; infer second feature data through an inference model included in the correction information using the normalized first feature data; and align the at least one letter to the reference line using the second feature data.

According to various example embodiments, the instructions, when executed, may cause the processor to: denormalize the second feature data; and align the at least one letter to the reference line by changing at least one of the position or the angle of the at least one letter using a coordinate change value included in the denormalized second feature data.

According to various example embodiments, the instructions, when executed, may cause the processor to: denormalize the second feature data; calculate a distribution of coordinate change values included in the denormalized second feature data; interpolate the distribution of the coordinate change values; generate a conversion table configured to function as a mapping function with the interpolated distribution of the coordinate change values; and align the at least one letter to the reference line by changing at least one of the position or the angle of the at least one letter based on a conversion value of the coordinate change value based on the generated conversion table.

Figure 23:
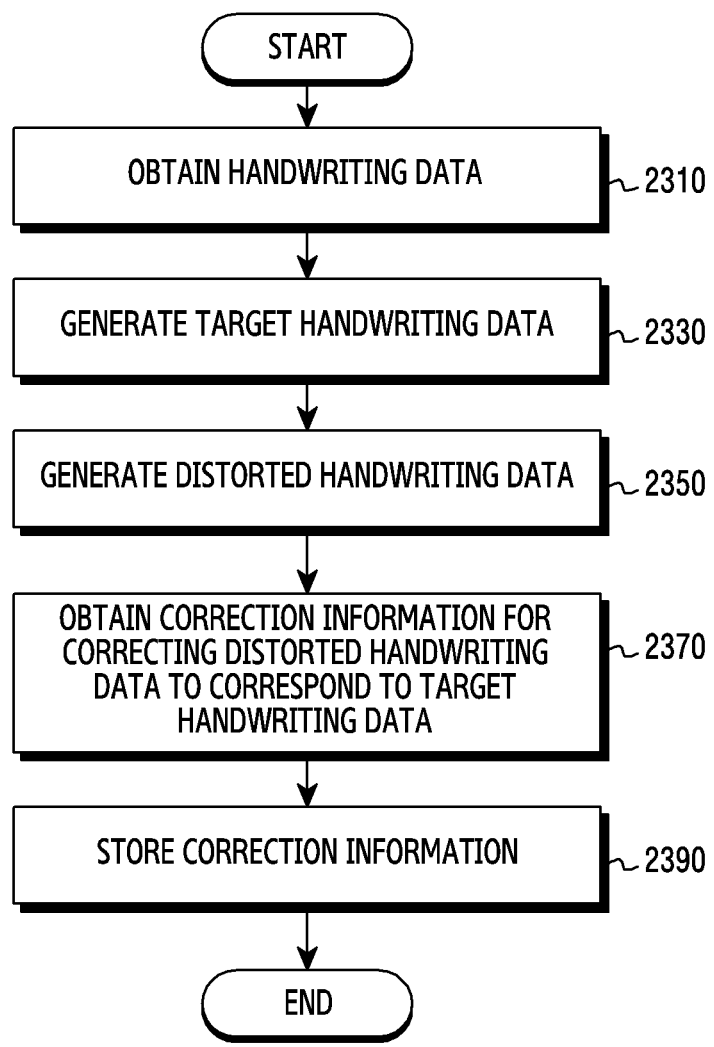
FIG. 23 is a flowchart illustrating an example method of correcting a handwriting input according to various embodiments.

FIG. 23 is a flowchart illustrating an example method of correcting a handwriting input according to various embodiments.

Referring to FIG. 23, a processor (e.g., the processor 270 of FIG. 2) of an electronic device (e.g., the electronic device 200 of FIG. 2) may obtain handwriting data in operation 2310. According to an embodiment, the processor may obtain the handwriting data pre-stored in a memory (e.g., the memory 290 of FIG. 2) of the electronic device. According to an embodiment, the processor may obtain the handwriting data according to a handwriting input received through an input device of the electronic device (e.g., the input device 210 of FIG. 2). According to an embodiment, the processor may obtain the handwriting data received from an external electronic device through a communication circuit (e.g., the communication circuit 250 of FIG. 2) of the electronic device. The obtained handwriting data may include at least one letter.

In operation 2330, the processor may generate target handwriting data. According to an embodiment, the processor may designate the acquired handwriting data as the target handwriting data. According to an embodiment, the processor may generate the target handwriting data by preprocessing the obtained handwriting data. According to an embodiment, the processor may generate the target handwriting data by aligning the obtained handwriting data (or the preprocessed handwriting data). For example, the processor may generate the target handwriting data by aligning the at least one letter included in the obtained handwriting data with a reference line.

In operation 2350, the processor may generate distorted handwriting data. According to an embodiment, the processor may generate the distorted handwriting data by performing processing such as line distortion, noise addition, or height normalization on the obtained handwriting data (or the preprocessed handwriting data). For example, the processor may generate at least one of the distorted handwriting data by changing at least one of a position or an angle of the at least one letter included in the obtained handwriting data.

In operation 2370, the processor may obtain correction information for correcting the distorted handwriting data to correspond to the target handwriting data. According to an embodiment, the processor may extract first feature data from the distorted handwriting data, extract second feature data from the target handwriting data, extracts second feature data from the target handwriting data, normalize the first feature data and the second feature data, and calculate a normalization vector included in the correction information by using the normalized first feature data and the normalized second feature data. According to an embodiment, the processor may learn the inference model included in the correction information through a deep learning-based algorithm using the normalized first feature data and the normalized second feature data. The inference model may be learned to output the normalized second feature data by receiving the normalized first feature data as input.

In operation 2390, the processor may store the correction information in the memory. For example, the processor may store the normalization vector and the inference model in the memory.

As described above, according to various example embodiments, a method of correcting a handwriting input of an electronic device (e.g., the electronic device 200 of FIG. 2) may include: obtaining handwriting data including at least one letter; generating target handwriting data by aligning the at least one letter with a reference line; generating distorted handwriting data by changing at least one of a position or an angle of the at least one letter; obtaining correction information (e.g., the learning data 291 of FIG. 2) for correcting the distorted handwriting data to correspond to the target handwriting data; and storing the correction information in a memory (e.g., the memory 290 of FIG. 2) of the electronic device.

According to various example embodiments, the operation of generating the distorted handwriting data may include: generating a plurality of points serving as a reference from the handwriting data; changing a first position of at least one of the plurality of points; calculating a linear slope, based on the plurality of points after the first position of the at least one point is changed; changing a second position of at least one other point whose position is not changed among the plurality of points through interpolation processing based on the linear slope; changing a third position of at least one of the plurality of points after the second position of the other at least one point is changed; generating a curve based on the plurality of points after the third position of the at least one point is changed; and generating the distorted handwriting data by changing positions of points of the handwriting data along the curve.

According to various example embodiments, the operation of generating the target handwriting data may include: determining an area of the at least one letter; selecting main points of the at least one letter based on a boundary line representing the area; and generating the target handwriting data by aligning the main points to be located on the reference line, wherein the reference line may include a corpus line and a base line of the handwriting data.

According to various example embodiments, the operation of generating the target handwriting data may further include: generating the target handwriting data by changing at least one of a height and a width of the handwriting data and aligning the main points to be located on the reference line.

According to various example embodiments, the operation of obtaining the correction information may include: extracting first feature data from the distorted handwriting data; extracting second feature data from the target handwriting data; normalizing the first feature data and the second feature data; and calculating a normalization vector included in the correction information using the normalized first feature data and the normalized second feature data.

According to various example embodiments, the first feature data includes arrangement information of each of first points of the distorted handwriting data, information representing a regional relationship between each of the first points and neighboring points, and information representing whether each of the first points is a start point or an end point of a stroke, and wherein the second feature data includes information on a positional relationship between each of second points of the target handwriting data and each of the first points corresponding to each of the second points.

According to various example embodiments, the operation of obtaining the correction information may include: learning an inference model included in the correction information through a deep learning-based algorithm using the normalized first feature data and the normalized second feature data.

According to various example embodiments, the inference model may be trained to output the normalized second feature data by taking the normalized first feature data as input, and may include at least one first layer in which recurrent neural networks are bidirectionally combined and a second layer for outputting a coordinate change value to be corrected by merging outputs of the at least one first layer.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that the various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, firmware or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136, or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code made by a complier or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separated and disposed to other component. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic device comprising:
a memory; and
a processor operatively connected to the memory,
wherein the memory stores instructions which, when executed, are configured to cause the processor to:
obtain handwriting data including at least one letter;
align the at least one letter with a reference line to generate target handwriting data;
change at least one of a position or an angle of the at least one letter to generate a plurality of distorted handwriting data;
obtain correction information for correcting the plurality of distorted handwriting data to correspond to the target handwriting data; and
store the correction information in the memory,
wherein generation of the target handwriting data comprises:
determination an area of the at least one letter;
selection of main points of the at least one letter based on a boundary line representing the area, wherein an upper main point of the main points is a center point of an upper boundary line of the boundary line, a lower main point of the main points is a center point of a lower boundary line of the boundary line, and the reference line includes a corpus line and a base line of the handwriting data; and
generation of the target handwriting data at least by aligning the upper main point to be located on the corpus line and by aligning the lower main point to be located on the base line, and
wherein generation of the plurality of distorted handwriting data comprises:
generation of a plurality of points as a reference from the handwriting data;
change of a first position of at least one point of the plurality of points;
calculation of a linear slope based on the plurality of points based on the first position of the at least one point being changed;
change of a second position of at least one other point whose position is not changed among the plurality of points through interpolation processing based on the linear slope;
change of a third position of at least one point of the plurality of points based on the second position of the at least one other point being changed;
generation of a curve based on the plurality of points based on the third position of the at least one point being changed; and
generation of distorted handwriting data included in the plurality of distorted handwriting data by changing positions of points of the handwriting data along the curve.

2. The electronic device of claim 1, wherein the instructions, when executed, cause the processor to generate the target handwriting data by changing at least one of a height and a width of the handwriting data and aligning the main points to be located on the reference line.

3. The electronic device of claim 1, wherein the instructions, when executed, are configured to cause the processor to:
extract first feature data from distorted handwriting data included in the plurality of distorted handwriting data;
extract second feature data from the target handwriting data;
normalize the first feature data and the second feature data; and
calculate a normalization vector included in the correction information using the normalized first feature data and the normalized second feature data.

4. The electronic device of claim 3, wherein the first feature data includes: arrangement information of each of first points of the distorted handwriting data, information representing a regional relationship between each of the first points and neighboring points, and information representing whether each of the first points is a start point or an end point of a stroke, and wherein the second feature data includes: information on a positional relationship between each of second points of the target handwriting data and each of the first points corresponding to each of the second points.

5. The electronic device of claim 3, wherein the instructions, when executed, are configured to cause the processor to learn an inference model included in the correction information through a deep learning-based algorithm using the normalized first feature data and the normalized second feature data.

6. The electronic device of claim 5, wherein the inference model is trained to output the normalized second feature data by taking the normalized first feature data as input, and includes at least one first layer in which recurrent neural networks are bidirectionally combined and a second layer for outputting a coordinate change value to be corrected by merging outputs of the at least one first layer.

7. An electronic device comprising:
an input module comprising input circuitry;
a memory including correction information for correcting at least one of a position or an angle of at least one letter included in each of a plurality of handwriting data; and
a processor operatively connected to the input module and the memory,
wherein the memory stores instructions which, when executed, are configured to cause the processor to:
receive a handwriting input through the input module;
determine whether at least one letter included in handwriting data corresponding to the handwriting input is aligned with a reference line; and
based on the at least one letter not being aligned with the reference line, change at least one of a position or an angle of the at least one letter to align with the reference line based on the correction information stored in the memory,
wherein changing the at least one of the position or the angle of the at least one letter to align with the reference line comprises:
extracting first feature data from the handwriting data;
normalizing the first feature data;
inferring second feature data through an inference model included in the correction information using the normalized first feature data;
denormalizing the second feature data; and
aligning the at least one letter to the reference line by changing at least one of the position or the angle of the at least one letter using a coordinate change value included in the denormalized second feature data.

8. The electronic device of claim 7, wherein the instructions, when executed, cause the processor to:
calculate a distribution of coordinate change values included in the denormalized second feature data;
interpolate the distribution of the coordinate change values;
generate a conversion table that functions as a mapping function with the interpolated distribution of the coordinate change values; and
align the at least one letter to the reference line by changing at least one of the position or the angle of the at least one letter based on a conversion value of the coordinate change value based on the generated conversion table.

9. A method of correcting a handwriting input of an electronic device, comprising:
obtaining handwriting data including at least one letter;
generating target handwriting data by aligning the at least one letter with a reference line;
generating a plurality of distorted handwriting data by changing at least one of a position or an angle of the at least one letter;
obtaining correction information for correcting the plurality of distorted handwriting data to correspond to the target handwriting data; and
storing the correction information in a memory of the electronic device,
wherein the generating of the target handwriting data comprises:
determining an area of the at least one letter;
selecting main points of the at least one letter based on a boundary line representing the area, wherein an upper main point of the main points is a center point of an upper boundary line of the boundary line, a lower main point of the main points is a center point of a lower boundary line of the boundary line, and the reference line includes a corpus line and a base line of the handwriting data; and
generating the target handwriting data by aligning the upper main point to be located on the corpus line and by aligning the lower main point to be located on the base line, and
wherein the generating of the plurality of distorted handwriting data comprises:
generating a plurality of points as a reference from the handwriting data;
changing a first position of at least one point of the plurality of points;
calculating a linear slope based on the plurality of points based on the first position of the at least one point being changed;
changing a second position of at least one other point whose position is not changed among the plurality of points through interpolation processing based on the linear slope;
changing a third position of at least one point of the plurality of points based on the second position of the at least one other point being changed;
generating a curve based on the plurality of points based on the third position of the at least one point being changed; and
generating distorted handwriting data included in the plurality of distorted handwriting data by changing positions of points of the handwriting data along the curve.

10. The method of claim 9, wherein the generating of the target handwriting data further comprises generating the target handwriting data by changing at least one of a height and a width of the handwriting data and aligning the main points to be located on the reference line.

11. The method of claim 9, wherein the obtaining of the correction information comprises:
extracting first feature data from distorted handwriting data included in the plurality of distorted handwriting data;
extracting second feature data from the target handwriting data;
normalizing the first feature data and the second feature data; and
calculating a normalization vector included in the correction information using the normalized first feature data and the normalized second feature data.

12. The method of claim 11, wherein the first feature data includes: arrangement information of each of first points of the distorted handwriting data, information representing a regional relationship between each of the first points and neighboring points, and information representing whether each of the first points is a start point or an end point of a stroke, and
    wherein the second feature data includes: information on a positional relationship between each of second points of the target handwriting data and each of the first points corresponding to each of the second points.

13. The method of claim 11, wherein the obtaining of the correction information comprises learning an inference model included in the correction information through a deep learning-based algorithm using the normalized first feature data and the normalized second feature data.

14. The method of claim 13, wherein the inference model is trained to output the normalized second feature data by taking the normalized first feature data as input, and includes: at least one first layer in which recurrent neural networks are bidirectionally combined and a second layer for outputting a coordinate change value to be corrected by merging outputs of the at least one first layer.

\* \* \* \* \*